United States Patent
Mole et al.

(10) Patent No.: US 11,610,172 B2
(45) Date of Patent: Mar. 21, 2023

(54) BENCHMARKING THROUGH DATA MINING

(71) Applicant: Xero Limited, Wellington (NZ)

(72) Inventors: Tim Mole, Auckland (NZ); Grant Anderson, Wellington (NZ)

(73) Assignee: Xero Limited, Wellington (NZ)

( * ) Notice: Subject to any disclaimer, the term of this patent is extended or adjusted under 35 U.S.C. 154(b) by 0 days.

(21) Appl. No.: 17/650,189

(22) Filed: Feb. 7, 2022

(65) Prior Publication Data

US 2022/0156669 A1    May 19, 2022

Related U.S. Application Data

(63) Continuation of application No. 16/715,409, filed on Dec. 16, 2019, now Pat. No. 11,288,615, which is a
(Continued)

(51) Int. Cl.
*G06Q 10/06* (2012.01)
*G06Q 10/0639* (2023.01)

(52) U.S. Cl.
CPC ............... *G06Q 10/06393* (2013.01)

(58) Field of Classification Search
None
See application file for complete search history.

(56) References Cited

U.S. PATENT DOCUMENTS 6,738,736 B1    5/2004    Bond
7,895,102 B1 *  2/2011    Wilks ............... G06Q 40/06
                                              434/362
(Continued)

FOREIGN PATENT DOCUMENTS

AU      2013204719 A1    11/2013
WO    WO-2006102515 A1 *  9/2006  ............ G06F 21/10
(Continued)

OTHER PUBLICATIONS

Joseph Paradi and Haiyan Zhu, "A survey on bank branch efficiency and performance research with data envelooment analysis," Feb. 6, 2012, Omega—The International Journal of Management Science, vol. 41, pp. 61-79. (Year: 2012).*
(Continued)

*Primary Examiner* — Amanda Gurski
(74) *Attorney, Agent, or Firm* — Schwegman Lundberg & Woessner, P.A.

(57) ABSTRACT

A system with access to regularly updated information regarding an entity can generate information regarding the performance of that entity. For example, values of various key performance indicators (KPIs) can be determined. One or more of the values can be compared to a corresponding threshold or range. Based on the results of the comparisons, an alert can be generated and sent to a user associated with the entity, a user interface (UI) that presents information to the user about the entity can include information regarding the KPIs, or both. The system may have access to data regarding a number of similar entities. Using the data for the similar entities, one or more benchmarks for the KPIs of the entity can be determined. The KPIs can be compared to the benchmarks and the results shown in a UI, an alert, or both.

19 Claims, 20 Drawing Sheets

Related U.S. Application Data continuation of application No. 16/027,989, filed on Jul. 5, 2018, now Pat. No. 10,546,261, which is a continuation of application No. 14/696,925, filed on Apr. 27, 2015, now Pat. No. 10,037,506.

(56) References Cited

U.S. PATENT DOCUMENTS

| | | | |
|---|---|---|---|
| 10,037,506 | B2 | 7/2018 | Mole et al. |
| 10,546,261 | B2 | 1/2020 | Mole et al. |
| 2002/0049621 | A1* | 4/2002 | Bruce ............ G06Q 10/0633 705/7.26 |
| 2003/0182181 | A1 | 9/2003 | Kirkwood et al. |
| 2006/0212791 | A1 | 9/2006 | Crow et al. |
| 2008/0125155 | A1* | 5/2008 | Saito ................ H04L 1/0073 375/E1.005 |
| 2008/0126155 | A1* | 5/2008 | Xu ................ G06Q 10/06375 705/7.29 |
| 2014/0058801 | A1* | 2/2014 | Deodhar ......... G06Q 10/0639 705/7.38 |
| 2016/0314423 | A1 | 10/2016 | Mole et al. |
| 2018/0330301 | A1 | 11/2018 | Mole et al. |
| 2020/0118055 | A1 | 4/2020 | Mole et al. |

FOREIGN PATENT DOCUMENTS

| | | |
|---|---|---|
| WO | WO-2006102515 A1 | 9/2006 |
| WO | WO-2016175869 A1 | 11/2016 |

OTHER PUBLICATIONS

Joseph Paradi and Haiyan Zhu, "A survey on bank branch efficiency and performance research with data envelopment analysis," Feb. 6, 2012, Omega—The International Journal of Management Science, vol. 41, pp. 61-79. (Year: 2012).*
"U.S. Appl. No. 14/696,925, Examiner Interview Summary dated Jan. 9, 2018", 3 pgs.
"U.S. Appl. No. 14/696,925, Examiner Interview Summary dated Mar. 7, 2016", 3 pgs.
"U.S. Appl. No. 14/696,925, Examiner Interview Summary dated Jun. 23, 2017", 2 pgs.
"U.S. Appl. No. 14/696,925, Final Office Action dated May 17, 2017", 11 pgs.
"U.S. Appl. No. 14/696,925, Final Office Action dated May 25, 2016", 21 pgs.
"U.S. Appl. No. 14/696,925, Non Final Office Action dated Sep. 23, 2016", 21 pgs.
"U.S. Appl. No. 14/696,925, Non Final Office Action dated Oct. 25, 2017", 13 pgs.
"U.S. Appl. No. 14/696,925, Non-Final Office Action Received dated Nov. 10, 2015", 16 pgs.
"U.S. Appl. No. 14/696,925, Notice of Allowance dated Mar. 29, 2018", 11 pgs.
"U.S. Appl. No. 14/696,925, Response filed Jan. 23, 2017 to Non Final Office Action dated Sep. 23, 2016", 20 pgs.
"U.S. Appl. No. 14/696,925, Response filed Jan. 24, 2018 to Non Final Office Action dated Oct. 25, 2017", 24 pgs.
"U.S. Appl. No. 14/696,925, Response filed Mar. 10, 2016 to Nov. 10, 2015", 11 pgs.
"U.S. Appl. No. 14/696,925, Response filed Aug. 25, 2016 to Final Office Action dated May 25, 2016", 15 pgs.
"U.S. Appl. No. 14/696,925, Response filed Sep. 15, 2017 to Final Office Action dated May 17, 2017", 20 pgs.
"U.S. Appl. No. 14/696,925, Response filed Oct. 12, 2015 to Restriction Requirement dated Aug. 28, 2015", 7 pgs.
"U.S. Appl. No. 14/696,925, Restriction Requirement dated Aug. 28, 2015", 7 pgs.
"U.S. Appl. No. 16/027,989, Advisory Action dated Mar. 4, 2019", 3 pgs.
"U.S. Appl. No. 16/027,989, Examiner Interview Summary dated Jan. 28, 2019", 3 pgs.
"U.S. Appl. No. 16/027,989, Final Office Action dated Dec. 14, 2018", 15 pgs.
"U.S. Appl. No. 16/027,989, Non Final Office Action dated Mar. 28, 2019", 9 pgs.
"U.S. Appl. No. 16/027,989, Non Final Office Action dated Aug. 23, 2018", 9 pgs.
"U.S. Appl. No. 16/027,989, Notice of Allowance dated Sep. 10, 2019", 9 pgs.
"U.S. Appl. No. 16/027,989, Response filed Feb. 19, 2019 to Final Office Action dated Dec. 14, 2018", 15 pgs.
"U.S. Appl. No. 16/027,989, Response filed Mar. 7, 2019 to Final Office Action dated Dec. 14, 2018", 13 pgs.
"U.S. Appl. No. 16/027,989, Response filed Nov. 7, 2018 to Non Final Office Action dated Aug. 23, 2018", 22 pgs.
"U.S. Appl. No. 16/027,989, Response filed Jun. 17, 2019 to Non-Final Office Action dated Mar. 28, 2019", 9 pgs.
"U.S. Appl. No. 16/715,409, Advisory Action dated Oct. 29, 2021", 3 pgs.
"U.S. Appl. No. 16/715,409, Final Office Action dated Aug. 4, 2021", 9 pgs.
"U.S. Appl. No. 16/715,409, Non Final Office Action dated Apr. 27, 2021", 8 pgs.
"U.S. Appl. No. 16/715,409, Notice of Allowance dated Nov. 22, 2021", 10 pgs.
"U.S. Appl. No. 16/715,409, Response filed Jul. 26, 2021 to Non Final Office Action dated Apr. 27, 2021", 10 pgs.
"U.S. Appl. No. 16/715,409, Response filed Oct. 22, 2021 to Final Office Action dated Aug. 4, 2021", 11 pgs.
"U.S. Appl. No. 16/715,409, Response filed Nov. 1, 2021 to Advisory Action dated Oct. 29, 2021", 10 pgs.
"Australian Application Serial No. 2015100770, Subsequent Examiners Report dated Mar. 7, 2016", 3 pgs.
"Australian Application Serial No. 2015100771, First Examiner Report dated Sep. 2, 2015", 4 pgs.
"Australian Application Serial No. 2015100771, Response filed Feb. 25, 2016 to First Examiner Report dated Sep. 2, 2015", 55 pgs.
"Australian Application Serial No. 2015100771, Subsequent Examiners Report dated Mar. 7, 2016", 3 pgs.
"Global Survey on Business Improvement and Benchmarking", A Global Benchmarking Network Publication, (2010), 40 pgs.
"International Application Serial No. PCT/US2015/031695, International Preliminary Report on Patentability dated Nov. 9, 2017", 8 pgs.
"International Application Serial No. PCT/US2015/031695, International Search Report dated Aug. 14, 2015", 2 pgs.
"International Application Serial No. PCT/US2015/031695, Written Opinion dated Aug. 14, 2015", 10 pgs.
"Open Standards Benchmarking Measure List", APQC, (2013), 203 pgs.
Joseph, Paradi, et al., "A survey on bank branch efficiency and performance research with data envelopment analysis", Omega—The International Journal of Management Science, vol. 41, (2012), 61-79.
Rigby, Darrell K., "Management Tools 2013 An executive's guide", Bain & Company, (2013), 68 pgs.
U.S. Appl. No. 14/696,925, now U.S. Pat. No. 10,037,506, filed Apr. 27, 2015, Benchmarking Through Data Mining.
U.S. Appl. No. 16/027,989, now U.S. Pat. No. 10,546,261, filed Jul. 5, 2018, Benchmarking Through Data Mining.
U.S. Appl. No. 16/715,409, filed Dec. 16, 2019, Benchmarking Through Data Mining.

* cited by examiner

1900

1905 — Account
| Name | OrganizationID | AccountTypePublicKey | DADPublicKey |

1910 — kpi.DAD
| DADID | CountryCode | Format | DADPublicKey |

1915 — kpi.AccountType
| AccountTypeID | TypeCode | ClassCode | Format | AccountTypePublicKey |

1920 — kpi.Component
| ComponentID | DADID | AccountTypeID | ValueLabelID | Label |

1925 — kpi.ComponentFact
| ComponentFactID | OrganizationID | ComponentID | DateID |
| DateGranularity | Value | TrendIndicatorID | |

1930 — kpi.DateDimension
| DateID | DateValue | Year | Month | Day |
| CalendarDisplay | MonthDisplay | WeekDisplay | | |

1935 — kpi.DateGranularity
| DateGranularity | Name |

1940 — kpi.MetricComponent
| MetricID | ComponentID |

1945 — kpi.Metric
| MetricID | Name | Definition | Format |

1950 — kpi.TrendIndicator
| TrendIndicatorID | Trend |

1955 — kpi.MetricFact
| MetricFactID | OrganizationID | MetricID | DateID |
| DateGranularity | Value | TrendIndicatorID | |

*FIG. 19*

BENCHMARKING THROUGH DATA MINING

CLAIM OF PRIORITY

This application is a Continuation Application under 35 USC § 120 of U.S. patent application Ser. No. 16/715,409, entitled "Benchmarking Through Data Mining," filed on Dec. 16, 2019, which is a Continuation Application under 35 USC § 120 of U.S. patent application Ser. No. 16/027,989, entitled "Benchmarking Through Data Mining," filed on Jul. 5, 2018, which is a Continuation Application under 35 USC § 120 of U.S. patent application Ser. No. 14/696,925, entitled "Benchmarking Through Data Mining," filed on Apr. 27, 2015, and is herein incorporated by reference in its entirety.

TECHNICAL FIELD

The present disclosure generally relates to systems and methods for benchmarking through data mining.

BACKGROUND

Entities compare their attributes to benchmarks generated from broad groups of entities of the same type. For example, schools and businesses are interested in determining where they stand compared to other schools or businesses. The broad groups are defined on a geographic basis. For example, an economic report for a country may show a national productivity gain over a period of time, to which a business can compare itself.

BRIEF DESCRIPTION OF THE DRAWINGS

Some embodiments are illustrated by way of example and not of limitation in the figures of the accompanying drawings.

FIG. 19 is a block diagram of a database schema used for benchmarking through data mining, according to some example embodiments.

DETAILED DESCRIPTION

Figure 1:
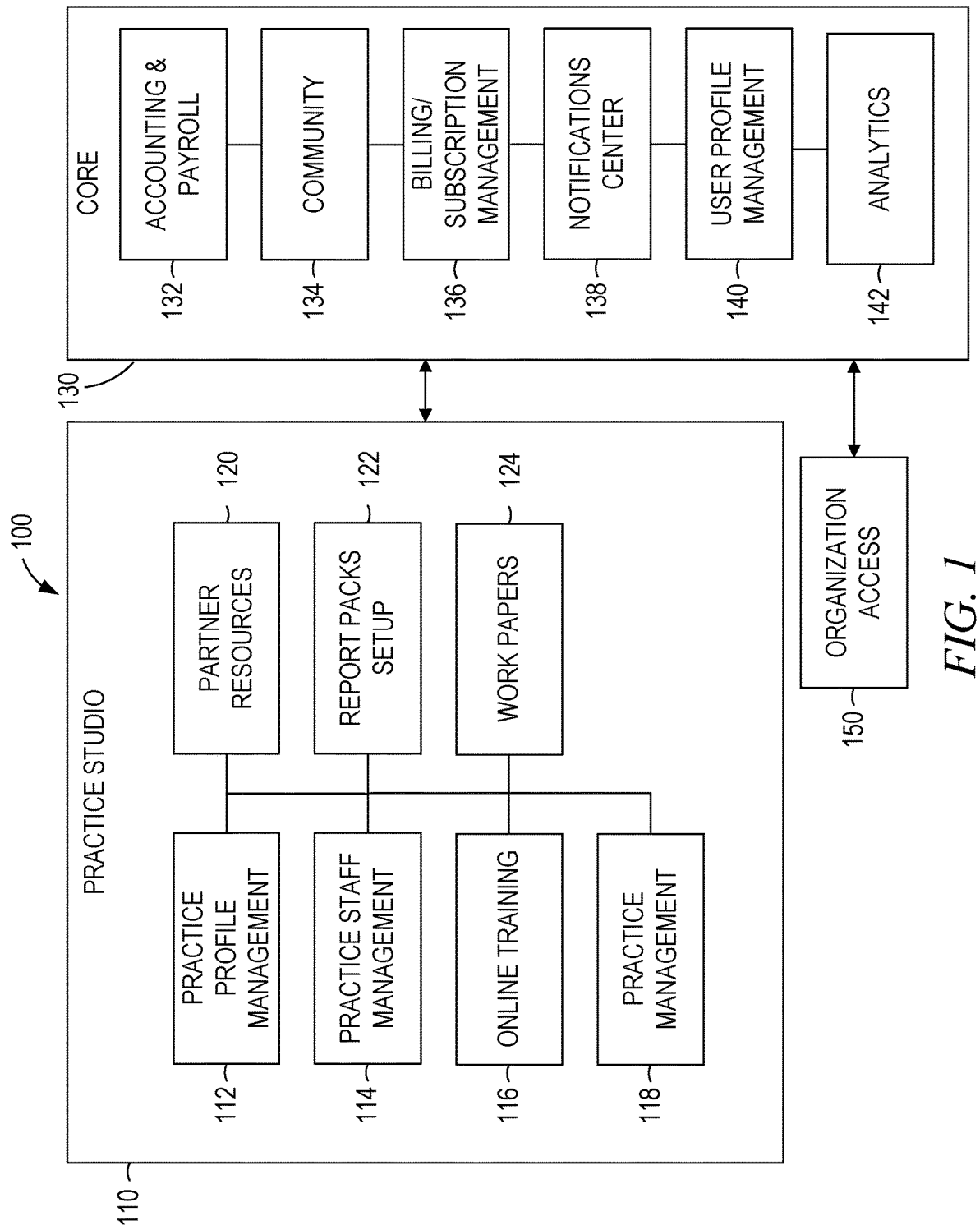
FIG. 1 is a block diagram depicting an example single ledger accounting platform, according to some embodiments.

A user may wish to monitor one or more attributes of an entity. An entity is any individual or organization. For example, an entity may be a business, school, church, city, state, club, or sports team. An attribute of an entity is a measurable fact regarding the entity. For example, an individual has attributes including height, weight, gender, heart rate, and frequency of exercise. Similarly, a business has attributes including the present amount of liquid capital, amount of debt, outstanding liabilities, unpaid invoices, number of transactions in a predetermined time period, average transaction size, number of full-time employees, location, turnover rate, debt-to-equity ratio, floor space, land area, profit as a percentage of stock, profit as a percentage of land area, and profit as a percentage of retail space.

An accounting system with access to financial information of the entity can generate information regarding the financial status of the entity. For example, any attribute of a business can be determined as a business indicator (BI). One or more of the BIs can be compared to a threshold to determine if the BI is above or below the threshold. Similarly, one or more of the BIs can be compared to a target range to determine if the BI is within, below, or above the target range. Based on the results of the comparisons, an alert can be generated and sent to the user. Similarly, a user interface (UI) that presents information to the user about the business can include information regarding the BIs, including the relationship between the BI and the threshold or target range. Though the discussion herein focuses on business entities and BIs, the systems and methods herein are applicable to any entity and its attributes.

The BIs may be key performance indicators (KPIs), which are identified as being particularly useful for comparing different businesses. In many cases, KPIs are ratios, with a raw value for the business divided by a size measure for the business, such as number of full-time employees, and so take into account business size prior to comparison. Some example KPIs include debtor days on invoices, trend in revenue and costs, accounts payable, gross profit, net profit, cost of sales as a percentage of turnover, total expenses as a percentage of turnover, interest coverage, gross profit margin, current ratio, inventory turnover, debt to equity ratio, return on investment, debt service coverage, return on capital employed, times interest earned, quick ratio, work capital to total assets ratio, debt ratio, and so on.

The accounting system may have access to financial data regarding a number of other businesses. Based on one or more similarities between the business associated with the user and the other businesses, a set of similar businesses can be identified. Using the data for the similar businesses, one or more benchmarks for the BIs of the business can be determined. The BIs can be compared to the benchmarks and the results shown in a UI, an alert, or both. The comparisons generated in this way may be more specific than comparisons generated using a national economic report or other general data source. Accordingly, benchmarks generated through data mining may enable more effective planning and reduce time wasted through the use of irrelevant or barely-relevant benchmarks.

FIG. 1 is a block diagram depicting an example single ledger accounting system 100. A single ledger accounting system 100 may provide accounting tools to a particular entity managing accounting for one or more businesses. The example single ledger accounting system 100 may include a practice studio 110 that allows an entity to manage one or more businesses and an organization access module 150 that provides a business with tools for managing accounting data for that particular business. The practice studio 110 may include a practice profile management module 112, a practice staff management module 114, an online training module 116, a practice management module 118, a partner resources module 120, a report packs setup module 122, and a work papers module 124. The practice studio 110 may be in communication with the core features 130. The core features 130 may include an accounting and payroll module 132, a community module 134, a billing/subscription management module 136, a notifications center module 138, a user profile management module 140, and an analytics module 142. The organization access module 150 may be in communication with the core features 130. The practice studio 110 and core features 130 may be accessed by an entity using a login module (not shown).

As shown in FIG. 1, features of the system 100 are divided into three areas based on the target user. The features of the practice studio 110 provide a suite of tools for accountants to interact with their clients and manage their practices. The core features 130 provide the core functionality and user tools common to both accountants and businesses. The organization access module 150 provides a user interface for individual businesses to access their data.

Practice studio 110 is the central login for accountants. For example, an accountant with multiple clients, each of which is a small business, can login using practice studio 110 and gain access to the accounting data for the clients, messages from the clients, and so on.

The practice profile management module 112 allows an accounting practice to manage and view its profile settings. For example, an accounting practice may have a partner level, representing the strength of its relationship with the provider for the accounting platform. The partner level may be based on the number of clients associated with the accounting practice in the accounting platform. For example, a bronze partner level may be assigned to accounting practices with at least 5 clients, a silver partner level assigned to accounting practices with at least 20 clients, and a gold partner level assigned to accounting practices with at least 100 clients. Alternatively or additionally, the accounting practice may have one or more certifications provided by the accounting platform. The certifications may be provided automatically based on the completion of an online test and may expire after the elapse of a predetermined period (e.g., one year). Other profile settings may include the name, address, telephone number, email address, and so forth of the accounting practice.

The practice staff management module 114 provides the ability for the manager of an accounting practice to control settings for the staff of the practice. For example, some staff members may have read-only access to data for certain clients, some staff members may have read-write access for certain clients, some staff members may be able to modify the access permissions for other staff members, and so on.

The online training module 116 provides training for accountants and their staff. In some cases, the provided training includes one or more video presentations and one or more online tests. Notification of passing a test at completion of a training may be provided. For example, a staff member may take a training course and, upon successful completion, the accountant supervising the staff member may receive a notification of the successful completion.

The practice management module 118 provides services for accountants. Access to the features provided by the practice management module 118 may be limited to accountants having a predetermined partner level with the accounting platform provider. For example, access to the practice management module 118 may be limited to accountants at silver level or above. The services provided by the practice management module 118 may include workflow tools, customer relationship management (CRM) tools, lead generation tools, job management tools, invoice generation tools, and so forth.

The partner resources module 120 provides information regarding third-party partners. For example, a third party may provide tools that interact with the system 100 to provide useful functionality beyond that of the system alone. The user can access the partner resources module 120 to learn about available third-party tools. For example, links to third-party websites, documentation, videos, and search tools may all be provided.

The report packs setup module 122 provides tools to allow accountants to create and generate standardized sets of reports. For example, a profit and loss statement and quarterly report could both be added to a pack. The accountant would then be able to easily generate both reports for any selected client or generate the reports for every client.

The work papers module 124 provides tools for accountants to interactively create financial reports. For example, an accountant can enter known data for a client into the work paper and then send the work paper to the client with an indication of data needed from the client. After the client enters the missing data into the work paper, the accountant can complete the report.

The core features 130 includes modules that are used both by accountants and organizations. The accounting and payroll module 132 provides the general ledger for organizations. The general ledger may be integrated with the organization's payroll, bypassing the separate step of entering payroll data into the general ledger each pay period. The accounting and payroll module 132 accesses banking data for each client business. The banking data may be imported either through a bank feed or a user- or accountant-created document. The accounting and payroll module 132 may also communicate with third-party tools via an application protocol interface (API).

The community module 134 provides a forum through which users can communicate. For example, a user with a question may post a topic in the forum and later receive a helpful response from another user. Information taken from the user profile (e.g., the user profile managed via the user profile management module 140) may appear along with forum posts by the user. For example, a user name, an image of the user, and the user's status as an accountant or member of an organization may each be shown.

The billing/subscription management module 136 allows a user to configure one or more billing accounts for each organization using the system 100. The system 100 may periodically charge a subscription fee for access (e.g., a monthly or annual subscription fee). The subscription fee may be automatically deducted from the one or more billing accounts.

The notifications center 138 provides notifications to users. For example, users may send messages to each other, which appear as notifications. Notifications may also be created by the system 100 (e.g., by accounting and payroll module 132) based on events. For example, a minimum account balance for a particular bank account may be set by a user via the accounting and payroll module 132. When the balance for that bank account drops below the minimum account balance, a notification can be generated by the system 100 to inform the user.

The user profile management module 140 allows a user to manage the profile of the user's organization and the profiles of others based on permission settings. For example, an accountant may have permission to manage the profiles of the accountant's clients. The profile may include public-facing information such as a business name and address.

The login module verifies the identify of a user logging into the system 100 (e.g., via user name and password). Based on the user's identity, a user interface is presented that includes a list of organizations that a user has access to. For most small business clients, the list will consist of a single organization.

The analytics module 142 analyzes and correlates data from different organizations. For example, a benchmark for a particular key performance indicator can be generated from a set of organizations and compared to the key performance indicator for another organization. Results from the comparison can be presented to a representative of the organization, an accountant for the organization, an auditor of the organization, or other interested parties.

The organization access module 150 accesses the core features 130 for a single organization. The organization access module 150 presents, after user verification by the login module, a user interface with options for a single organization without the additional features used only by the practice studio 110.

Figure 2:
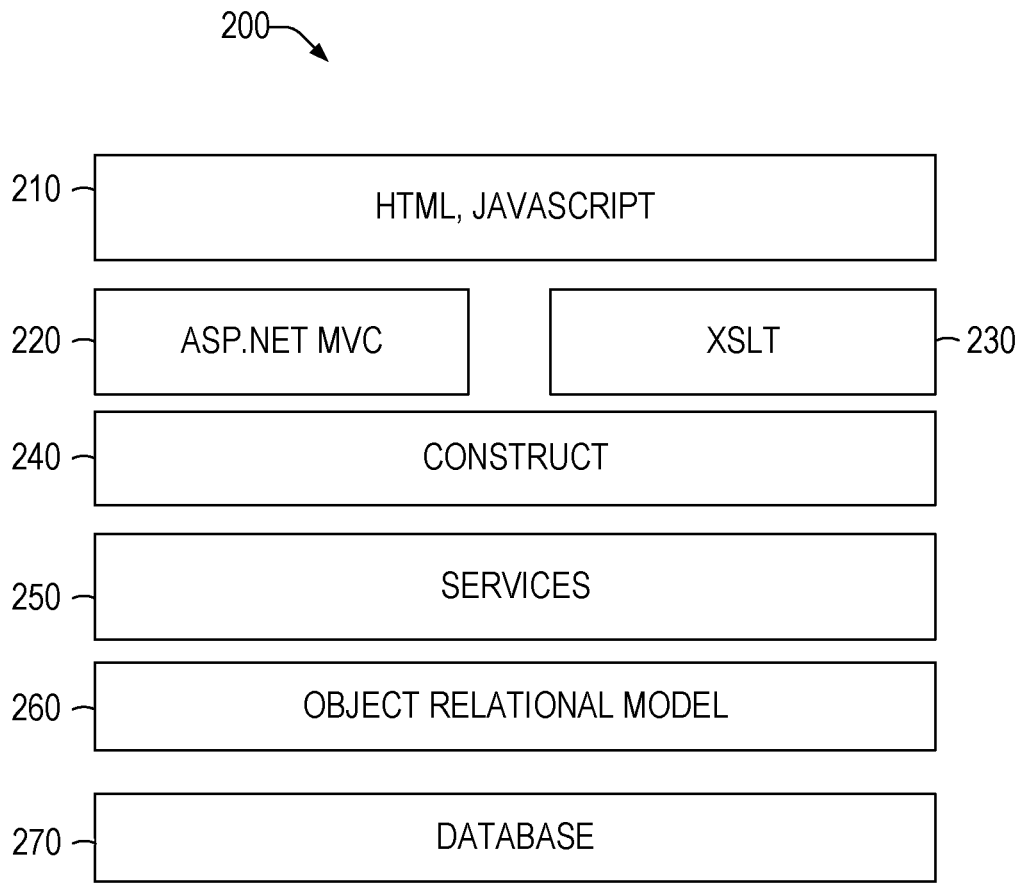
FIG. 2 is a block diagram depicting an example accounting application framework for the accounting platform, according to some embodiments.

FIG. 2 is a block diagram depicting an example accounting application framework 200 for the accounting platform. The accounting application framework 200 may be an end-to-end web development framework enabling a "software as a service" (SaaS) product. The accounting application framework 200 may include a hypertext markup language (HTML) and/or JavaScript layer 210, ASP.Net model-view-controller (MVC) 220, extensible stylesheet language transformations (XSLT) 230, construct 240, services 250, object relational model 260, and database 270.

The HTML and/or JavaScript layer 210 provides client-side functionality, such as UI generation, receipt of user input, and communication with a server. The client-side code may be created dynamically by the ASP.NET MVC 220 or the XSLT 230. Alternatively, the client-side code may be statically created or dynamically created using another server-side tool.

The ASP.Net MVC 220 and XSLT 230 provide server-side functionality, such as data processing, web page generation, and communication with a client. Other server-side technologies may also be used to interact with the database 270 and create an experience for the user.

The construct 240 provides a conduit through which data is processed and presented to a user. For example, the ASP.Net MVC 220 and XSLT 230 can access the construct 240 to determine the desired format of the data. Based on the construct 240, client-side code for presentation of the data is generated. The generated client-side code and data for presentation is sent to the client, which then presents the data.

The services 250 provide reusable tools that can be used by the ASP.Net MVC 220, the XSLT 230, and the construct 240 to access data stored in the database 270. For example, aggregate data generated by calculations operating on raw data stored in the database 270 may be made accessible by the services 250. Aggregated data in the database 270 may be used in the process of identifying a group of comparable entities, generating benchmarks based on the group of comparable entities, and generating alerts based on one or more benchmarks transgressing a threshold.

The object relational model 260 provides data structures usable by software to manipulate data stored in the database 270. For example, the database 270 may represent a many-to-one relationship by storing multiple rows in a table, with each row having a value in common. By contrast, the software may prefer to access that data as an array, where the array is a member of an object corresponding to the common value. Accordingly, the object relational model 260 may convert the multiple rows to an array when the software accesses them and perform the reverse conversion when the data is stored.

Figure 3:
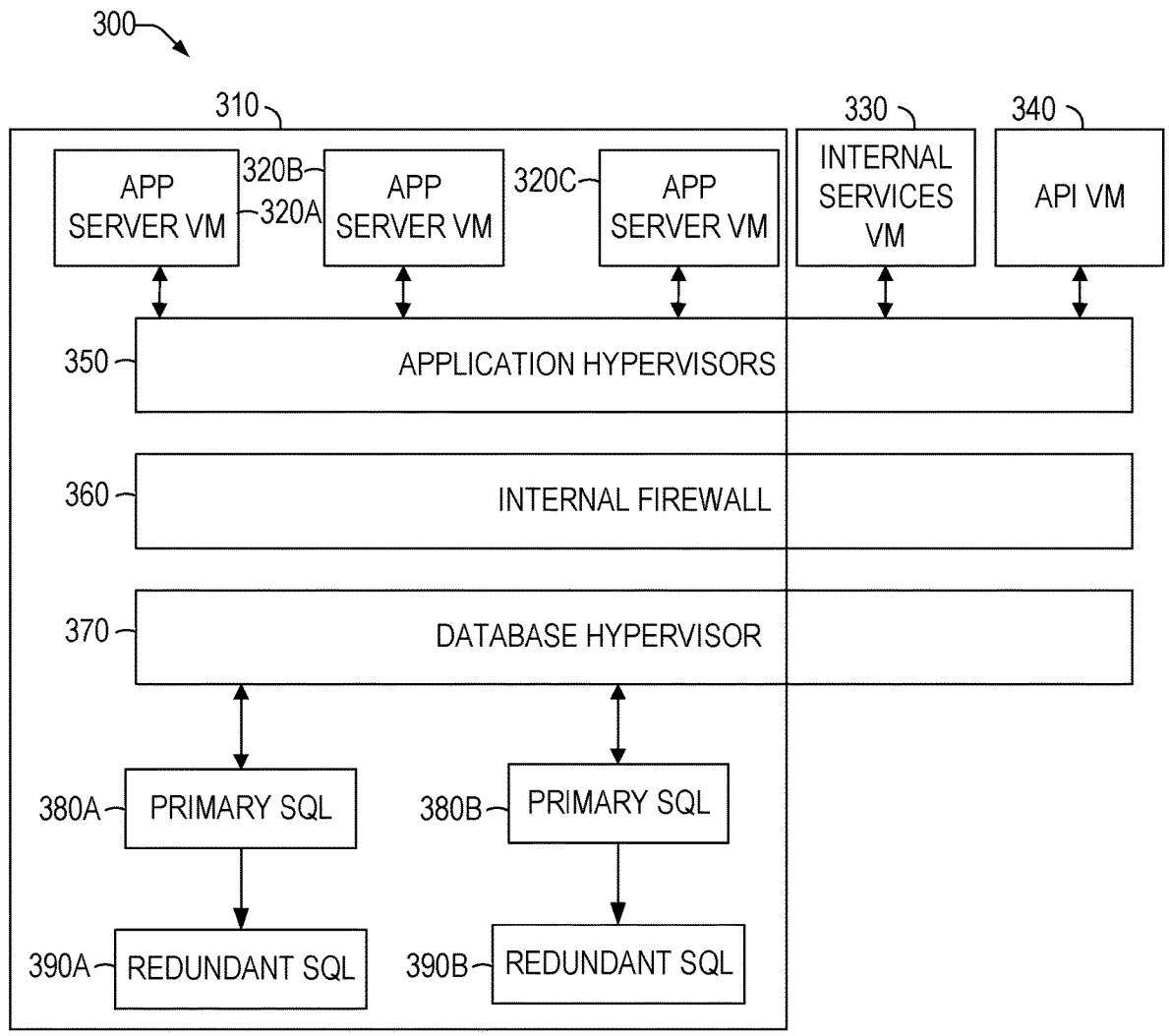
FIG. 3 is a block diagram depicting an example hosting infrastructure for the accounting platform, according to some embodiments.

FIG. 3 is a block diagram depicting an example hosting infrastructure 300 for the accounting platform. The platform may be implemented using one or more pods 310. Each pod 310 includes application server virtual machines (VMs) 320 (shown as application server virtual machines 320a-320c in FIG. 3) that are specific to the pod 310 as well as application server virtual machines 320 that are shared between pods 310 (e.g., the internal services VM 330 and the application protocol interface VM 340). The application server virtual machines 320-340 communicate with clients and third-party applications via a web interface or an API. The application server virtual machines 320-340 are monitored by application hypervisors 350. In some example embodiments, the application server virtual machines 320a-320c and the API VM 340 are publicly-accessible while the internal services VM 330 is not accessible by machines outside of the hosting infrastructure 300. The app server VMs 320a-320c may provide end-user services via an application or web interface. The internal services VM 330 may provide back-end tools to the app server VMs 320a-320c, monitoring tools to the application hypervisors 350, or other internal services. The API VM 340 may provide a programmatic interface to third parties. Using the programmatic interface, the third parties can build additional tools that rely on the features provided by the pod 310.

The internal firewall 360 ensures that only approved communications are allowed between the database hypervisor 370 and the publicly accessible virtual machines 320-340. The database hypervisor 370 monitors the primary structured query language (SQL) servers 380a and 380b. The primary SQL servers 380a and 380b access the shared storage layer 450a or 450b (shown in FIG. 4) to read and write data generated by or used by the application server virtual machines 320-340. The redundant SQL servers 390a and 390b provide backup functionality for the primary SQL servers 380a and 380b, respectively.

The virtual machines 320-340 can be implemented using Windows 2008 R2, Windows 2012, or another operating system. The application and support servers supporting the virtual machines 320-340 can be built using spares for redundancy. The support servers can be shared across multiple pods 310. The application hypervisors 350, internal firewall 360, and database hypervisor 370 may span multiple pods 310 within a data center. In some example embodiments, each primary SQL server 380 and redundant SQL server 390 is configured to support 30,000-45,000 organizations. Accordingly, in embodiments using two such server pairs per pod 310, the pod capacity is 60,000-90,000 organizations. The redundant SQL servers 390 may take advantage of the "always on" resilience feature of SQL 2012.

Figure 4:
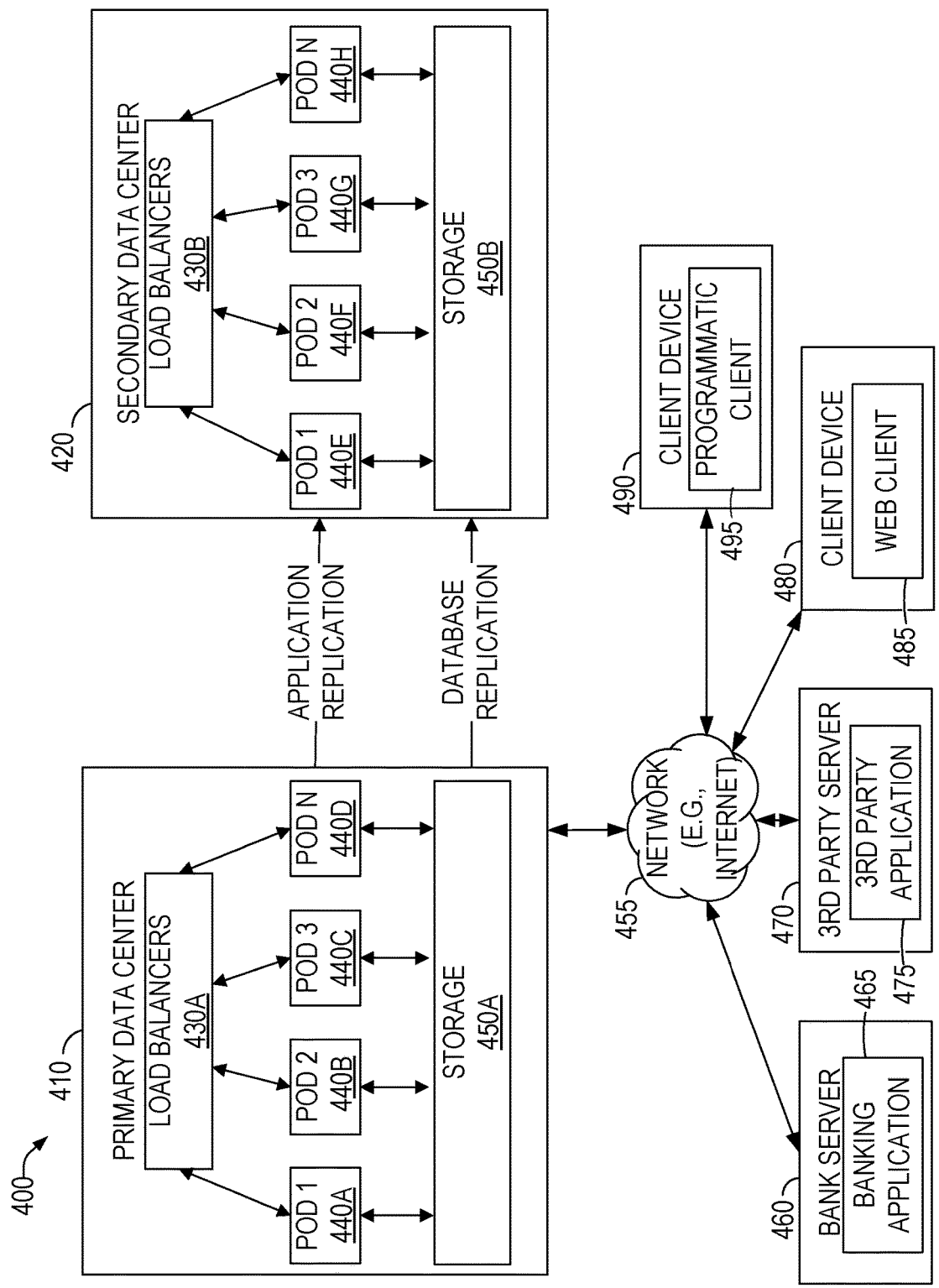
FIG. 4 is a block diagram depicting an example data center system of the accounting platform, according to some embodiments.

FIG. 4 is a block diagram depicting an example data center system 400 of the accounting platform interacting with other systems over a network. The primary data center 410 services customer requests and is replicated to the secondary data center 420. The secondary data center 420 may be brought online to serve customer requests in case of a fault in the primary data center 410. The primary data center 410 communicates over a network 455 with bank server 460, third party server 470, client device 480, and client device 490. The bank server 460 provides banking data (e.g., via the banking application 465). The third party server 470 is running third party application 475. Client devices 480 and 490 interact with the primary data center 410 using web client 485 and programmatic client 495, respectively.

Within each data center 410 and 420, a plurality of pods, such as the pod 310 of FIG. 3, are shown. The primary data center 410 is shown containing pods 440a-440d. The secondary data center 420 is shown containing pods 440e-440h. The applications miming on the pods of the primary data center 410 are replicated to the pods of the secondary data center 420. For example, EMC replication (provided by EMC Corporation) in combination with VMWare site recovery manager (SRM) may be used for the application layer replication. The database layer handles replication between the storage layer 450a of the primary data center 410 and the storage 450b of the secondary data center 420. Database replication provides database consistency and the ability to ensure that all databases 270 are at the same point in time.

The data centers 410 and 420 use load balancers 430a and 430b, respectively, to balance the load on the pods within each data center. The data centers 410 and 420 can be created using identical hardware to ensure that the performance of the secondary data center 420 is the same as the performance of the primary data center 410. The storage 450 may be implemented using one or more EMC VNX storage area networks.

The bank server 460 interacts with the primary data center 410 to provide bank records for bank accounts of the client. For example, the client may provide account credentials to the primary data center 410, which the primary data center 410 uses to gain access to the account information of the client. The bank server 460 can provide the banking records to the primary data center 410 for later reconciliation by the client using the client device 480 or 490.

The third-party server 470 may interact with the primary data center 410 and the client device 480 or 490 to provide additional features to a user of the client device 480 or 490. For example, a user may authorize the third-party server 470 to access the user's data stored in the primary data center 410. The third-party application 475 of the third-party server 470 may use the user's data to generate reports, provide macros, or otherwise improve the user's ability to access or manipulate the user's data. The third-party application 475 may communicate with the primary data center 410 via the network 455 using an API. The third-party application 475 may communicate with the client device 480 or 490 using a web or programmatic interface.

Figure 5:
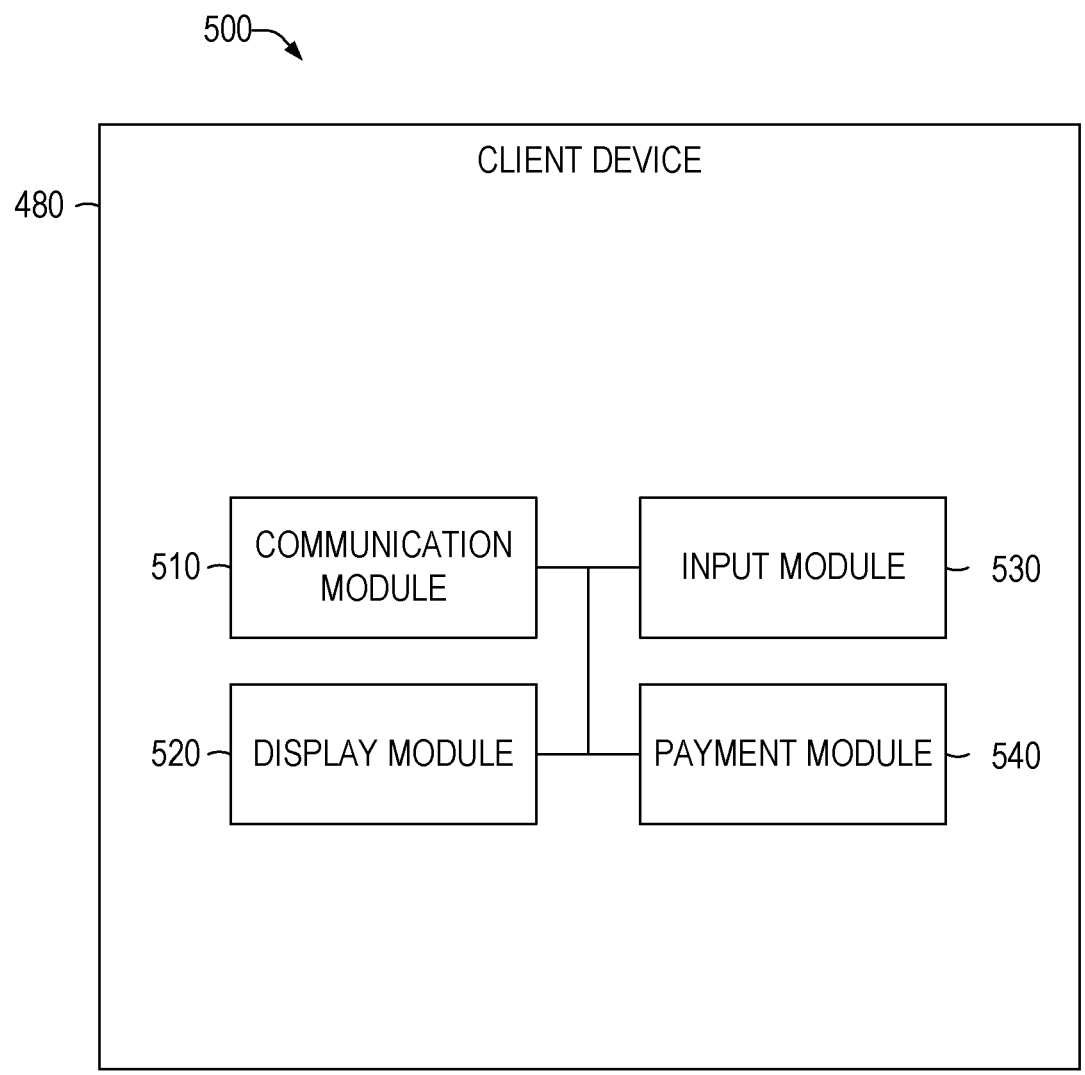
FIG. 5 is a block diagram depicting an example client device for accessing the accounting platform, according to some embodiments.

FIG. 5 is a block diagram 500 illustrating components of a client device 480 or 490 suitable for mobile banking reconciliation, according to some example embodiments. The client device 480 or 490 is shown as including a communication module 510, a display module 520, an input module 530, and a payment module 540, configured to communicate with each other (e.g., via a bus, shared memory, or a switch).

The communication module 510 may communicate with the primary data center 410, the third-party server 470, the network 455, or any suitable combination thereof. Information received via the communication module 510 may be presented (e.g., displayed on a display device) via the display module 520. Information may be selected or search queries may be entered by a user of the client device 480 or 490.

A user interface is presented by the display module 520. The input from the user is detected by the input module 530. Commands received from the user by the input module 530 may be communicated to the primary data center 410 by the communication module 510. The communication module 510 may receive a response from the primary data center 410 that includes a set of banking records, a set of business records, associations between individual banking records and individual business records that indicate reconciliation between those records, and other data, in any combination.

The payment module 540 can generate requests to the primary data center 410 to pay a bill. The request can be communicated to the primary data center 410 via the communication module 510 over the network 455.

Figure 6:
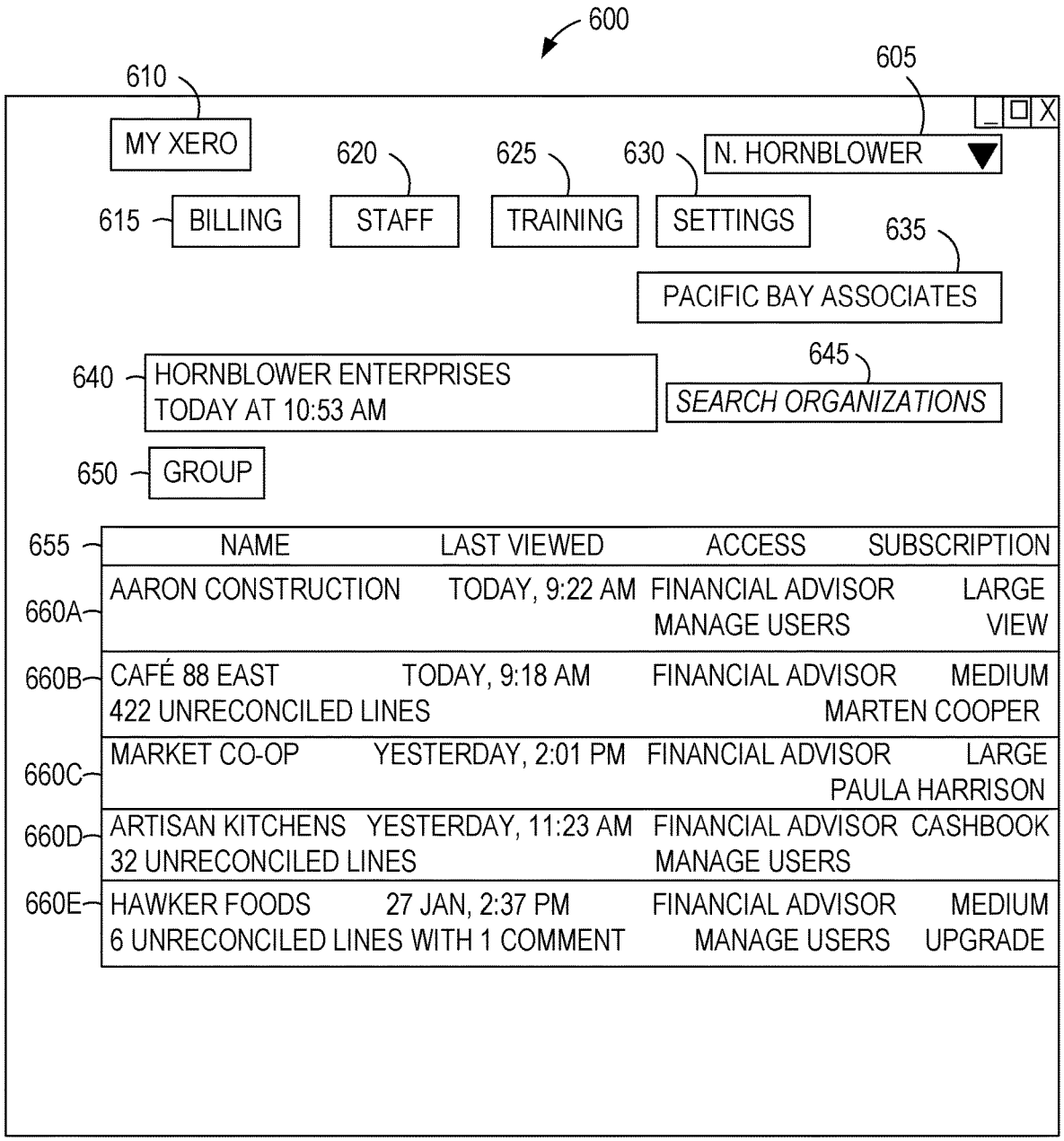
FIG. 6 is an interface diagram depicting an example user interface displaying accounts accessible by a user of the accounting platform, according to some embodiments.

FIG. 6 is an interface diagram depicting an example user interface 600 displaying accounts accessible by a user of the accounting platform. The elements 660a-660e are individual rows of data with information about different businesses and may be referred to collectively as elements 660. Similarly, an individual one of the elements 660 may be referred to as an element 660.

The element 605 shows the name of a logged-in user along with a downward-pointing arrow. The name or arrow may be operable to cause the display of a user profile menu. For example, the user may be able to change a contact email address, a password, and other individual information about the user.

The element 610 shows the name of the current application interface. In the example shown, the name is "My Xero." The element 610 may be used to distinguish between access by an organization (e.g., access via the organization access module 150) and access by an accounting practice (e.g., access via the practice studio 110). For example, the element 610 may be color-coded (e.g., blue for an organization and green for an accounting practice).

The elements 615-630 may be operable to cause the display of additional user interface options. For example, the element 615, labeled "Billing" may be operable to cause the display of a billing interface that allows the user to enter time-tracking information for use by the accounting and payroll module 132. The element 620, labeled "Staff," may be operable to bring up a staff interface that allows the user to control permissions for staff members. The functions of the staff interface may be implemented by the practice staff management module 114. For some users (e.g., for accountant users), the staff interface may allow the user to assign staff to particular jobs and may be implemented by the practice management module 118. The element 625, labeled "Training," may be operable to bring up a training interface that allows the user to schedule training sessions or review the results of training sessions. For example, the user may be enabled to set up a particular training session for a particular staff member. The element 630, labeled "Settings," may be operable to bring up a settings interface that allows the user to modify settings for the organization. For example, the organization may have a billing account on file that is used to pay for subscription access to the application. The settings interface can be used to add or change the billing account (e.g., using the billing/subscription management module 136).

The element 635 displays the name of the accountant for the organization. In some example embodiments, a logo for the accounting firm is also displayed. The elements 660A-660E show information for clients of the accounting firm.

The element 640 displays the currently selected organization and the last time data for the organization was updated.

The element 645 is a search box. The user may enter one or more search terms into the search box to cause the system 100 to search for organizations matching the search terms.

The element 650, labeled "Group," allows the user to select multiple organizations and put them into a custom group. Operations may then be performed on the group. For example, a report pack may be run on every organization in a selected group.

The element 655 is a header for the elements 660 with information regarding organizations to which the user has access. The element 655 shows that each element 660 has a name, a date on which it was last viewed, an access permission, and subscription data. For example, the name of the organization for element 660a is Aaron Construction. The element 660a further shows that Aaron Construction was last viewed today at 9:22 AM. As shown in the element 660a, the current user is a financial advisor for Aaron Construction, and has the access privileges to manage users. Similarly, the element 660a shows that Aaron Construction has a "Large" subscription. The word "View" in the element 660a may be operable to view subscription information for Aaron Construction.

Additional information about the available organizations may be shown in the elements 660. For example, the elements 660b, 660d, and 660e each show a number of unreconciled lines. This may suggest to the user that further reconciliation of banking and business records is needed for the corresponding organizations: Cafe 88 East, Artisan Kitchens, and Hawker Foods.

The elements 660 show at least a subset of the accounts to which the user has access. For example, the accounts may be associated with one or more organizations for which the user manages a business. The user may click on a link associated with one of the businesses to access and manage accounting information associated with that business.

As described above, FIGS. 1-6 relate to an example accounting system that gathers accounting data and provides accounting services to a plurality of entities. Though the processes and systems for benchmarking through data mining discussed herein are not limited to implementation in conjunction with the example accounting system, such a system may be well suited to the gathering of data useful for data mining for benchmark generation. For example, an accounting system providing a general ledger to an entity may have transaction-level data for the entity (e.g., invoices sent, payments received, payments made, or any suitable combination thereof). Similarly, an accounting system providing payroll services may have data regarding number of employees, pay rates for each employee, vacation accrued by each employee, title of each employee, or any suitable combination thereof. Data in the accounting system may be entered manually by a member of the entity (e.g., an accountant of the entity, an officer of the entity, multiple employees of the entity, the entity itself (e.g., if the entity is an individual), or any suitable combination thereof), automatically by another system (e.g., bank transactions may be automatically sent from a server of the bank to the accounting system), or both.

Figure 7:
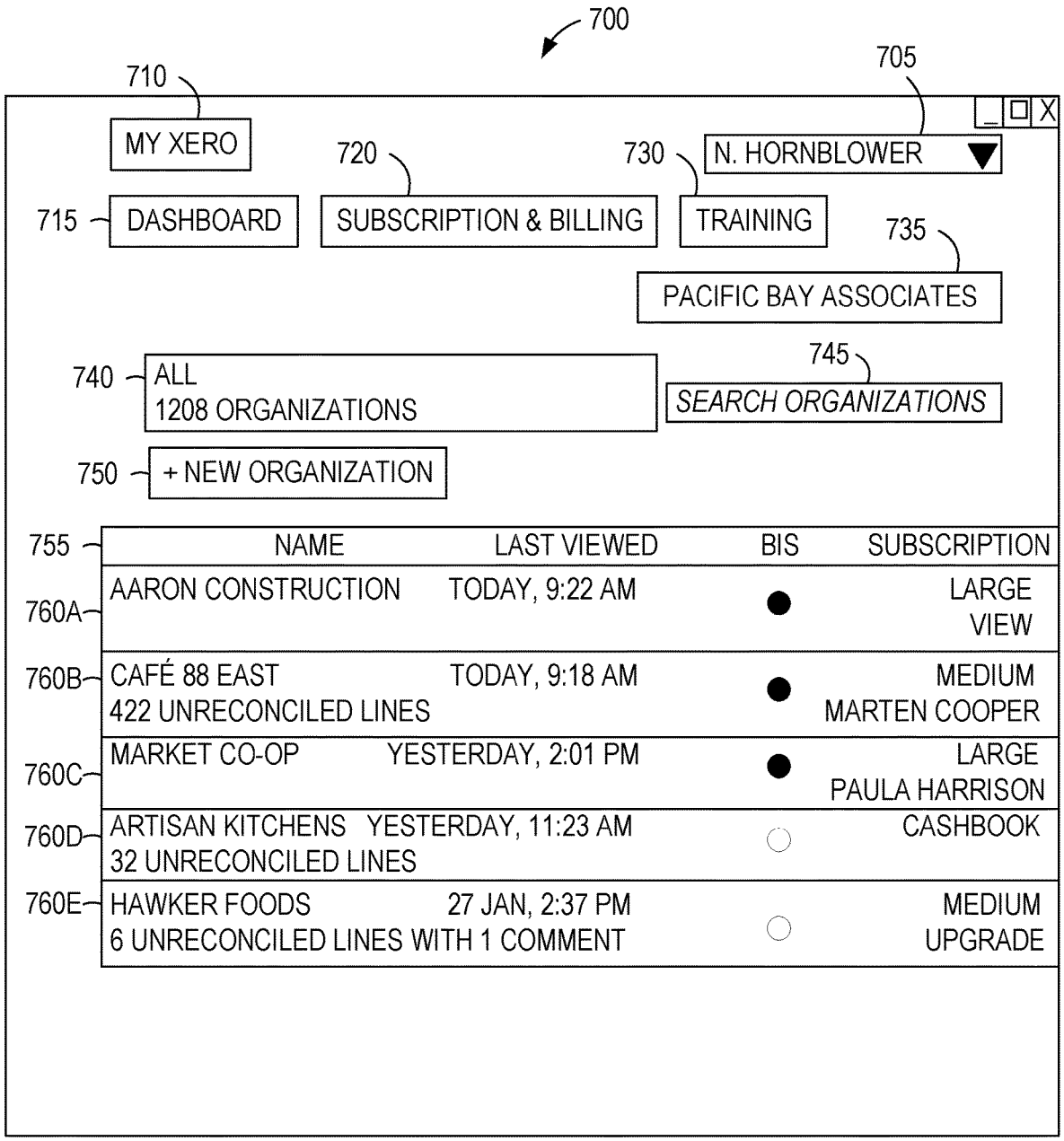
FIG. 7 is an interface diagram depicting an example user interface displaying accounts accessible by a user of the accounting platform, according to some embodiments.

FIG. 7 is an interface diagram 700 depicting an example user interface displaying accounts accessible by a user of the accounting platform, according to some embodiments. The user interface of FIG. 7 may be shown to an accounting services provider. The elements 760a-760e are individual rows of data with information about different businesses and may be referred to collectively as elements 760. Similarly, an individual one of the elements 760 may be referred to as an element 760.

The element 705 shows the name of a logged-in user along with a downward-pointing arrow. The name or arrow may be operable to cause the display of a user profile menu. For example, the user may be able to change a contact email address, a password, and other individual information about the user.

The element 710 shows the name of the current application interface. In the example shown, the name is "My Xero." The element 710 may be used to distinguish between access by an organization (e.g., access via the organization access module 150) and access by an accounting practice (e.g., access via the practice studio 110). For example, the element 710 may be color-coded (e.g., blue for an organization and green for an accounting practice).

The elements 715-730 may be operable to cause the display of additional user interface options. For example, the element 715, labeled "Dashboard" may be operable to cause the display of a dashboard interface that shows the user high-level summary information regarding the organization or accounting practice. The element 720, labeled "Subscription & Billing," may be operable to bring up a subscription and billing interface that allows the user to adjust options for a subscription to the accounting platform. The functions of the staff interface may be implemented by the billing/subscription management module 136. The element 730, labeled "Training," may be operable to bring up a training interface that allows the user to schedule training sessions or review the results of training sessions. For example, the user may be enabled to set up a particular training session for a particular staff member.

The element 735 displays the name of the accounting services provider. In some example embodiments, a logo for the accounting firm is also displayed.

The element 740 informs the user which set of organizations is currently being displayed in elements 755 and 760.

For example, the element 740 shows that currently "all" organizations are being shown, and that the result set includes "1208 organizations."

The element 745 is a search box. The user may enter one or more search terms into the search box to cause the system to search for organizations matching the search terms.

The element 750, labeled "New Organization" and including an icon of a plus sign allows the user to create a new organization or add a relationship with an existing organization.

The element 755 is a header for the elements 760 with information regarding organizations to which the user has access. The element 755 shows that each element 760 has a name, a date on which it was last viewed, BIs, and subscription data. The name, last viewed, and subscription fields correspond to the fields of the same names in elements 655 and 660 of FIG. 6. The BIs field indicates the status of the BIs for the corresponding business. For example, elements 760a-760c each show a filled-in circle for the BIs of Aaron Construction, Cafe 88 East, and Market Co-op. The filled-in circles indicate that each of those three businesses have at least one BI that is out of the target range or has crossed a threshold. As another example, elements 760d and 760e show hollow circles for the BIs of Artisan Kitchens and Hawker Foods. The hollow circles indicate that each of those two businesses have no BIs that are out of the target range or have crossed a threshold.

Only five elements 760 are shown in FIG. 7, but the element 740 indicates that 1208 organizations match the search results. The user may be able to access the other 1203 search results using scroll arrows, touch screen swipes, or other UI elements (not shown). The user may click on a link associated with one of the businesses shown in elements 760 to access and manage accounting information associated with that business.

Figure 8:
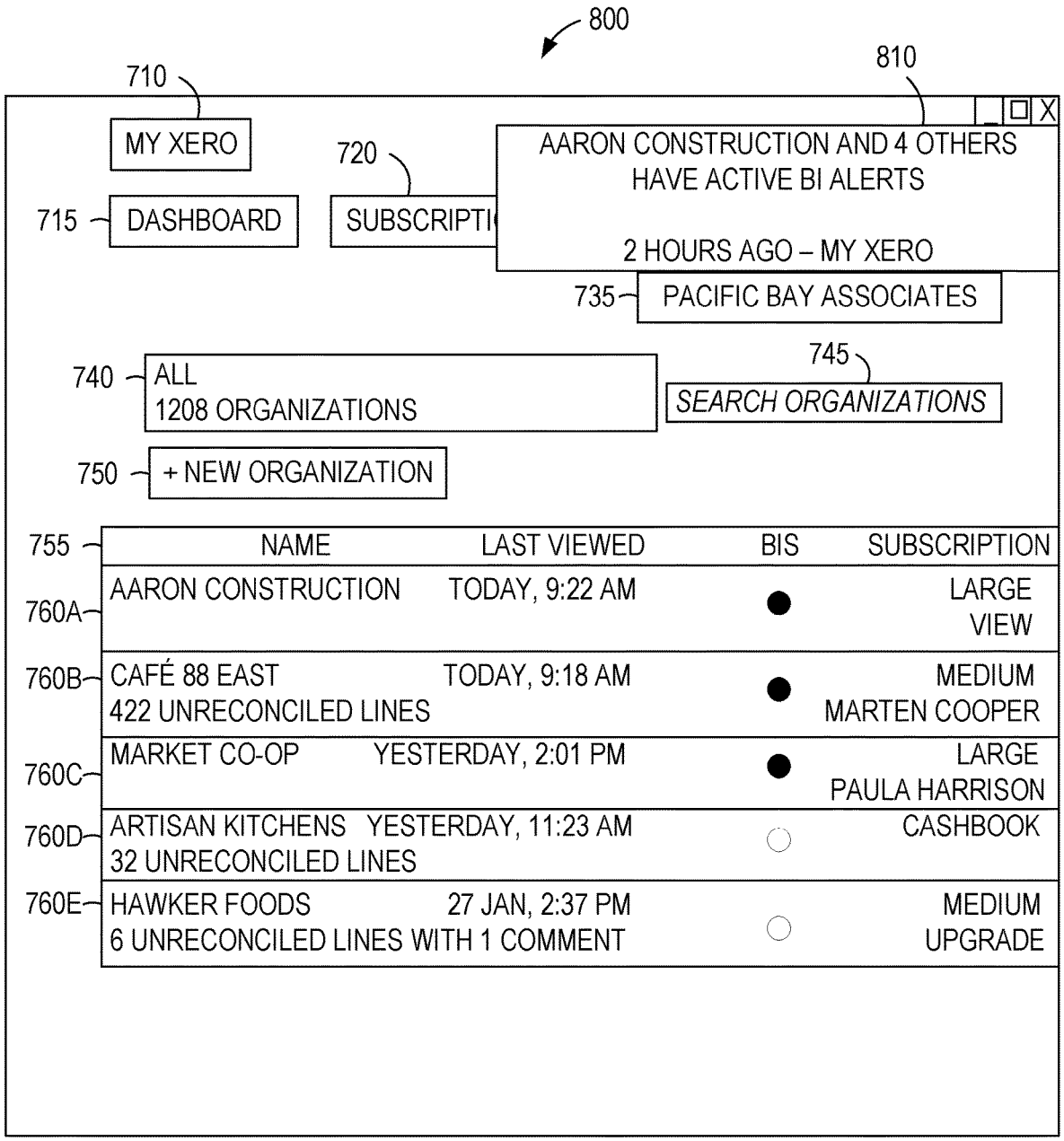
FIG. 8 is an interface diagram depicting an example user interface displaying an alert to a user of the accounting platform, according to some embodiments.

FIG. 8 is an interface diagram 800 depicting an example user interface displaying a summary of alerts to the user of the accounting platform, according to some embodiments. The user interface of FIG. 8 may be shown to an accounting services provider. The elements 710, 715, 720, 735, 740, 745, 750, 755, and 760A-760E are described above with respect to FIG. 7.

The element 810 is a box informing the user of five organizations with active BI alerts. The element 810 also informs the user when the most recent alert was generated. In this case, the most recent alert was generated two hours ago. The element 810 may be interactive. For example, the user may click on or touch the element 810 to dismiss the information and return to the screen shown in FIG. 7. Alternatively, the user may click on or touch the element 810 to request additional information about the alerts and move to the screen shown in FIG. 9. In some example embodiments, the screen is refreshed with new data (e.g., by dynamically modifying the data using JavaScript) rather than reloaded (e.g., by retrieving and rendering a new HTML page).

Figure 9:
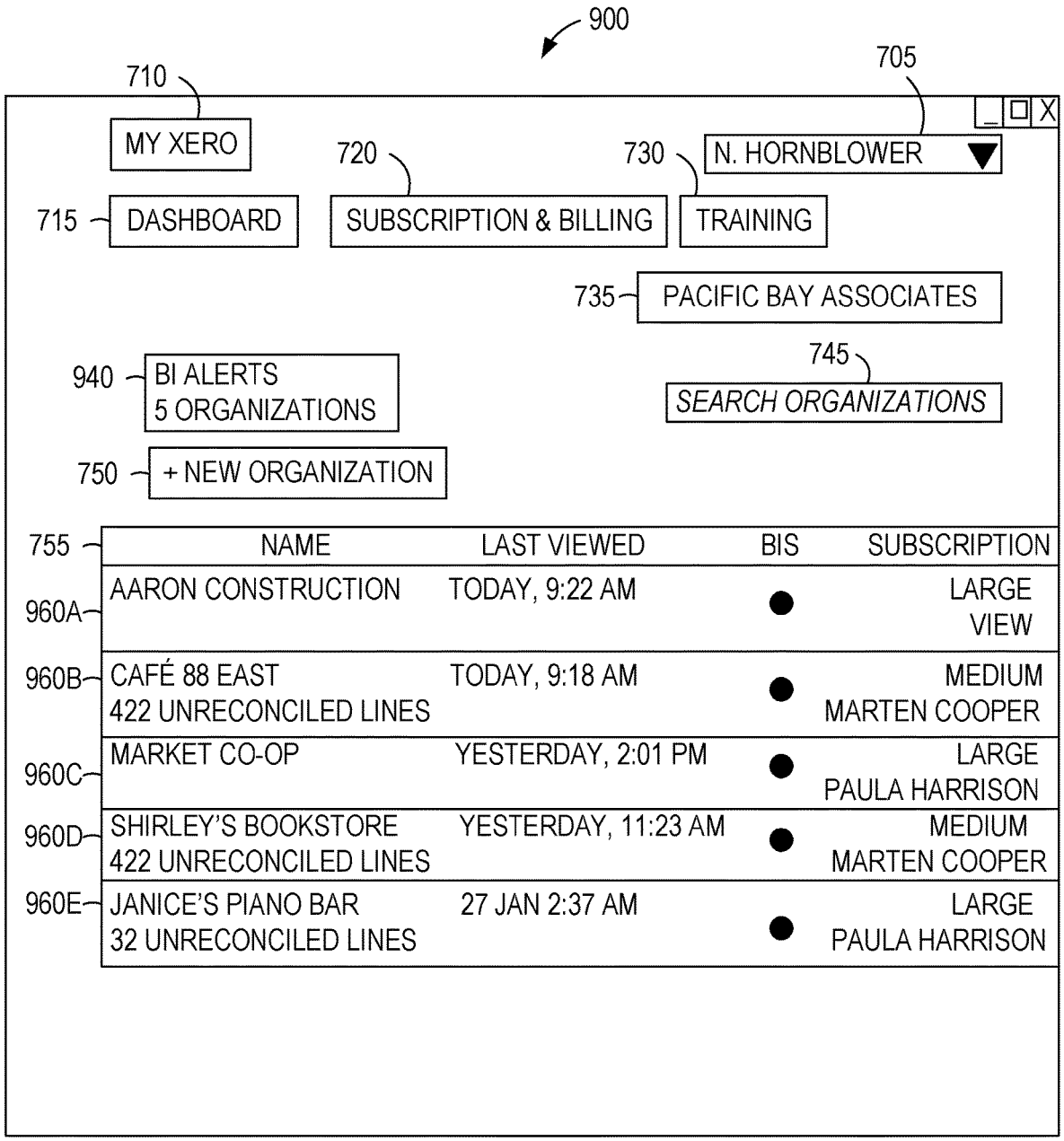
FIG. 9 is an interface diagram depicting an example user interface displaying accounts accessible by a user of the accounting platform, according to some embodiments.

FIG. 9 is an interface diagram 900 depicting an example user interface displaying accounts accessible by a user of the accounting platform, according to some embodiments. The user interface of FIG. 9 may be shown to an accounting services provider in response to operation of the element 745 to search for accounts meeting certain criteria, or by an interaction of the user with the element 810 to show the accounts that generated the alerts indicated in the element 810. The elements 705, 710, 715, 720, 730, 735, 745, 750, and 755 are described above with respect to FIG. 7.

The element 940 corresponds to the element 740, described above with respect to FIG. 7. However, the element 940 shows that the displayed set of accounts is not all 1208 organizations, as in FIG. 7, but the five organizations having BI alerts. Accordingly, the BIs field of the elements 960A-960E indicates that all five of the corresponding organizations have BI alerts.

Figure 10:
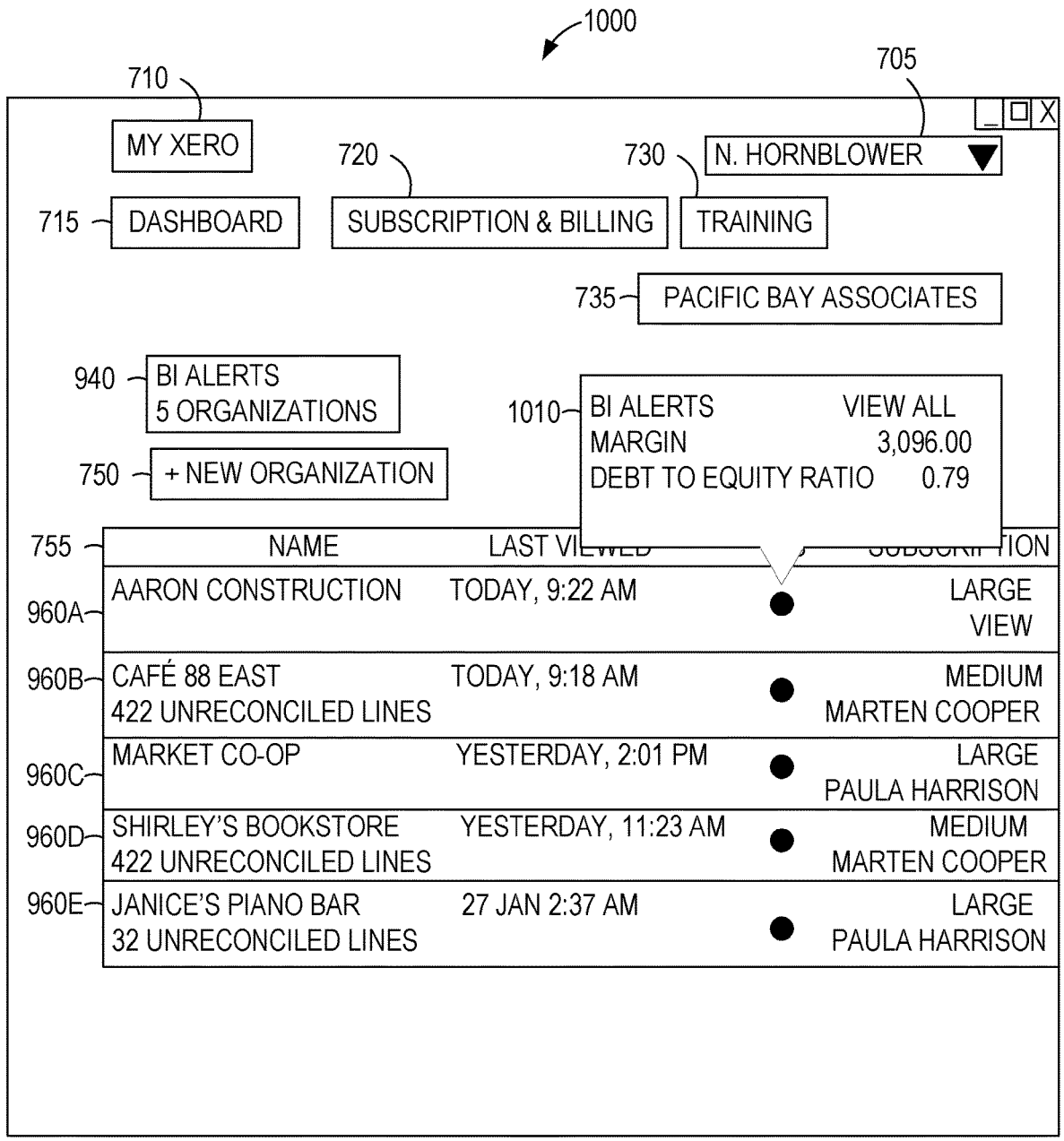
FIG. 10 is an interface diagram depicting an example user interface displaying alerts to a user of the accounting platform, according to some embodiments.

FIG. 10 is an interface diagram 1000 depicting an example user interface displaying an information window regarding the BIs for an organization, according to some embodiments. The user interface of FIG. 10 may be shown to an accounting services provider in response to an operation of the element 960A. For example, the user may click on or mouse over the BI circle of the element 960A to cause the display of the element 1010. The elements 705, 710, 715, 720, 730, 735, 750, and 755 are described above with respect to FIG. 7. The elements 940 and 960A-960E are described above with respect to FIG. 9.

The element 1010 shows information for two BI alerts. The first BI alert shows that the margin for Aaron Construction is 3,096.00. The second BI alert shows that the debt to equity ratio for Aaron Construction is 0.79. The "view all" text in the element 1010 may be operable to cause the display of all BIs for the organization, for example by causing the display of the user interface shown in FIG. 11.

Figure 11:
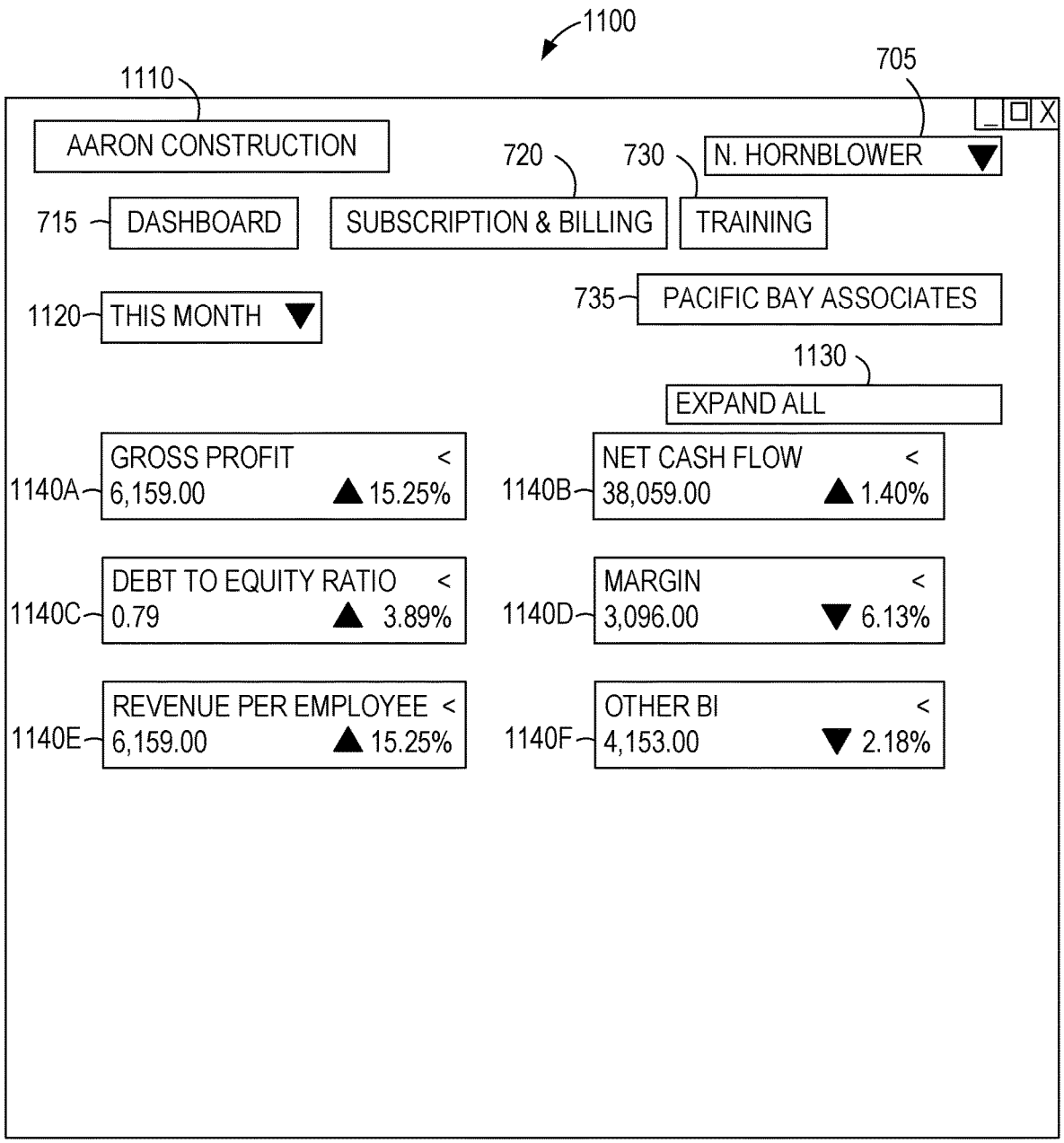
FIG. 11 is an interface diagram depicting an example user interface displaying key performance indicators to a user of the accounting platform, according to some embodiments.

FIG. 11 is an interface diagram 1100 depicting an example user interface displaying information regarding the BIs for an organization, according to some embodiments. The user interface of FIG. 11 may be shown to an accounting services provider in response to an operation of the element 1010. The elements 705, 715, 720, 730, and 735 are described above with respect to FIG. 7.

The element 1110 displays the name of the organization for which BIs are being displayed. In this case, the name of the organization is Aaron Construction.

The element 1120 displays the date range for which the BI values are being displayed. In this case, the date range is the current month. As shown in FIG. 11, the element 1120 includes a downward-pointing triangle, indicating that the element 1120 is operable as a drop-down list. Accordingly, the user may use the element 1120 to select a different date range, causing the BI values shown in elements 1140A-1140F to update.

The element 1130 is operable to expand each of the elements 1140A-1140F. This may cause the display of additional information regarding each BI and the corresponding value for the organization over the date range.

The elements 1140A-1140F each include information about one BI for the organization. For example, the element 1140A includes information about the gross profit for Aaron Construction this month, showing the gross profit as being 6,159.00, up 15.25% over a previous comparable time period. For example, when the date range shown in the element 1120 is the current month, the comparable time period may be the previous month. Similar comparisons may be made on a quarterly or annual basis, in addition to other time frames. The element 1140A also includes a left-pointing arrow, indicating that the element 1140A is currently minimized. By interacting with the left-pointing arrow or otherwise with the element 1140A, the element 1140A may be expanded into the element 1210, as shown in FIG. 12.

Figure 12:
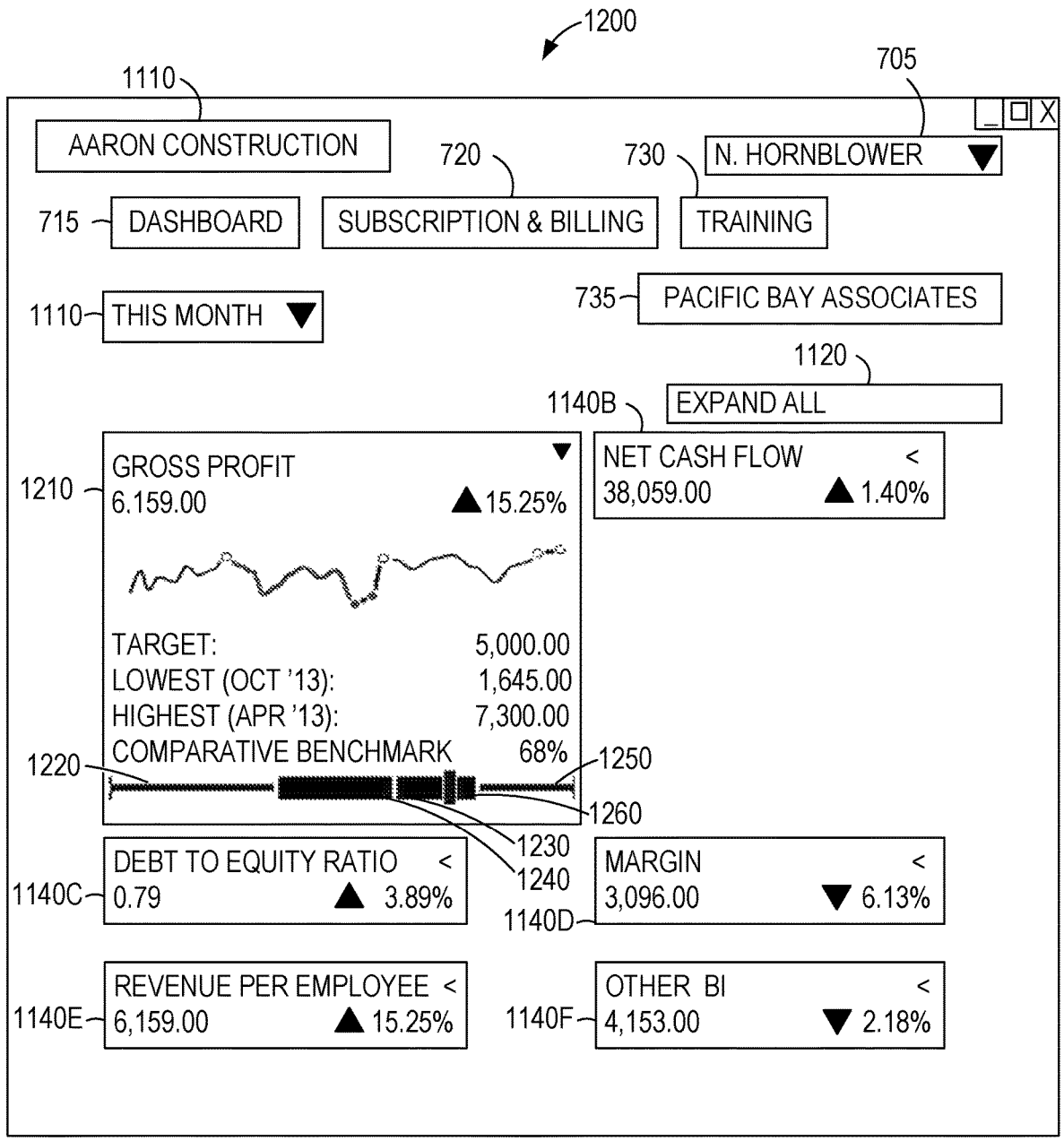
FIG. 12 is an interface diagram depicting an example user interface displaying key performance indicators to a user of the accounting platform, according to some embodiments.

FIG. 12 is an interface diagram 1200 depicting an example user interface displaying information regarding the BIs for an organization, according to some embodiments. The user interface of FIG. 12 may be shown to an accounting services provider in response to an operation of the element

1140a. The elements 705, 715, 720, 730, and 735 are described above with respect to FIG. 7. The elements 1110, 1120, and 1140B-1140F are described above with respect to FIG. 11.

The element 1210 corresponds to the element 1140A, described above with respect to FIG. 11, and shows additional detail regarding the "gross profit" BI. As with the element 1140A, the element 1210 shows the value of the BI, the direction of the change over the previous period, and the percentage of the change over the previous period. Additionally, the element 1210 shows a graph of the value of the BI over time, the current target value for the BI, the lowest and highest values for the BI, along with the dates on which those values occurred, and benchmark comparison data. The benchmark comparison data is shown both as a numerical value, 68%, and a graphical indicator. The graphical indicator shows the possible range of values for the BI divided into four quadrants 1220-1250, with the BI value of the organization indicated by a rectangle 1260. The color of the rectangle 1260 may be based on the comparative value. For example, a gross profit that is better than 50% of the comparable organizations may be shown in green, while a gross profit that is below the 50% mark may be shown in red. Similarly, the past values of the BI shown in the graph of the value of the BI over time may be color coded.

Figure 13:
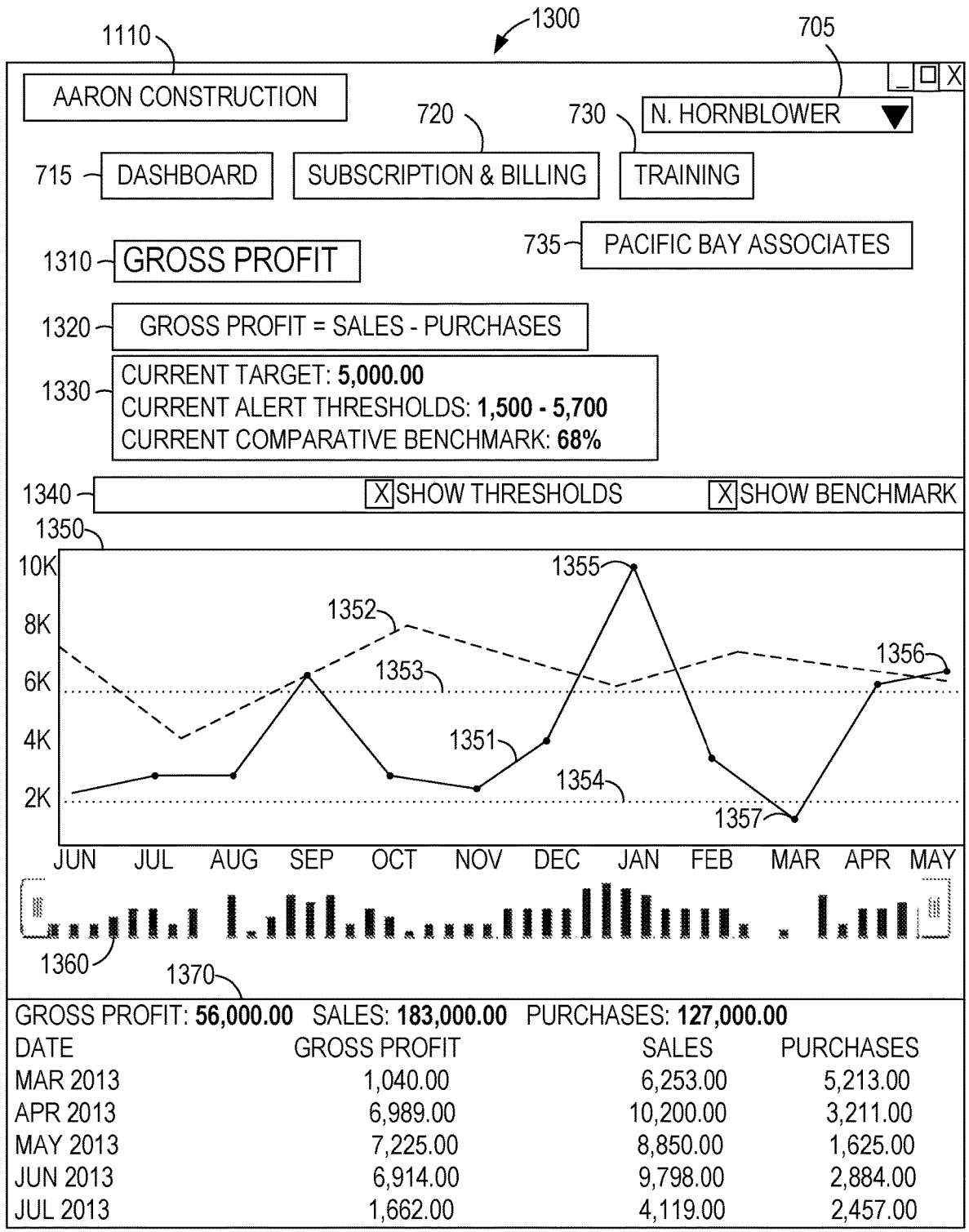
FIG. 13 is an interface diagram depicting an example user interface displaying key performance indicators to a user of the accounting platform, according to some embodiments.

FIG. 13 is an interface diagram 1300 depicting an example user interface displaying information regarding a particular BI for an organization, according to some embodiments. The user interface of FIG. 13 may be shown to an accounting services provider in response to an operation of the element 1210 or an operation of the BI name shown in the element 1210, in various embodiments. The elements 705, 715, 720, 730, and 735 are described above with respect to FIG. 7. The element 1110 is described above with respect to FIG. 11.

The element 1310 displays the name of the BI for which information is displayed in the elements 1330, 1350, 1360, and 1370. In this example, the BI is gross profit.

The element 1320 displays a definition of the BI. In this example, the element 1320 reminds the user that gross profit is the difference between sales and purchases.

The element 1330 shows the current target for the value of the BI, the current alert thresholds, and the current comparative benchmark. In this example, the current target is 5,000.00. The current alert thresholds are 1,500 and 5,700, meaning that an alert will be sent if the gross profit for this organization falls below 1,500 or exceeds 5,700. The current comparative benchmark is 68%. The current target and current comparative benchmark values are the same as those shown in the element 1210 of FIG. 12, discussed above.

The element 1340 includes checkboxes operable to change the information shown in the element 1350. As shown, the checkboxes for "show thresholds" and "show benchmark" are both checked. Accordingly, element 1350, showing the monthly gross profit values for the past year as a solid line 1351, also shows the benchmark values for each month as a dashed line 1352 and the thresholds as dotted lines 1353 and 1354. In the example shown, the thresholds are constant values across the entire graph, but in some embodiments the thresholds may vary on a monthly or other basis. For example, an accountant for the organization may have adjusted the current alert thresholds in January, causing one set of threshold values to be shown for months prior to January and the new set of threshold values to be shown for months after January. In some example embodiments, the thresholds are shown by shading the region between them. For example, the region between dotted lined 1353 and 1354 may be shown in gray or a transparent color that does not prevent simultaneous viewing of the solid line 1351. The values of the BI may be color-coded. For example, the values for January and May (elements 1355 and 1356, respectively), above the alert threshold, may be shown in green while the value for March (element 1357), below the alert threshold may be shown in red. The values within the alert threshold range may be shown in a neutral color, such as black or blue.

The element 1360 shows the value information in a different form. The grips on each end of element 1360 may be operable to change the date range shown in the element 1350. For example, clicking and dragging the left grip toward the right may cause the beginning of the graph to move forward in time. The element 1360 shows a micro sparkline of the chart data above. When the date range of the graph changes, the date range of the sparkline does not, allowing the user to continue to view the entire range of data while seeing more detailed information for a subset of the range at the same time.

The element 1370 shows more detail regarding the value of the BI in tabular form. The element 1370 shows the current BI value along with the values used in calculating the value of the BI. For example, the current gross profit, the current sales, and the current purchases are each shown. Additionally, monthly values for each of these are shown for prior months. In some example embodiments, other time periods are used. For example, a selector may be presented to allow the user to view results on a biweekly, quarterly, or annual basis.

Figure 14:
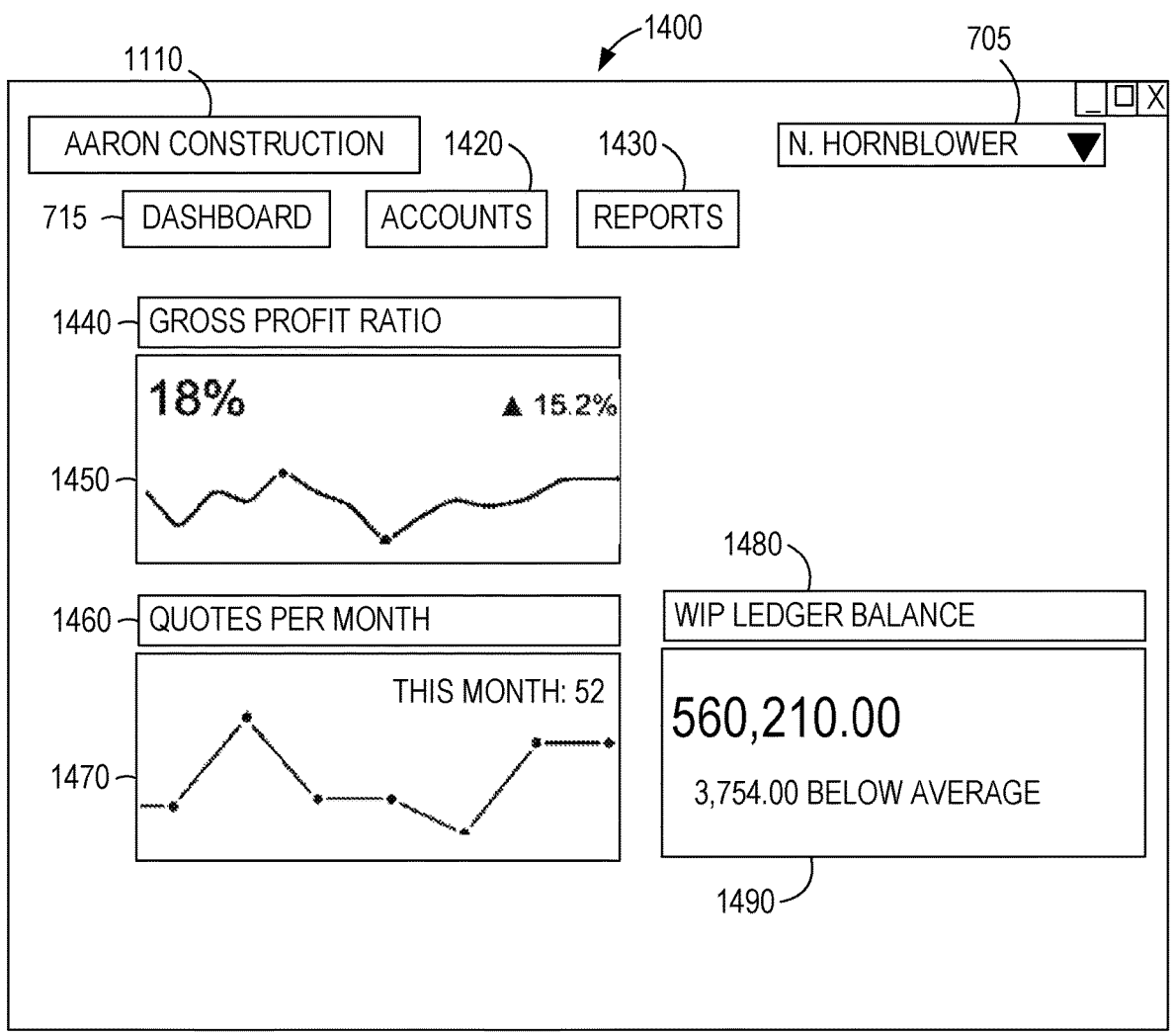
FIG. 14 is an interface diagram depicting an example user interface displaying key performance indicators to a user of the accounting platform, according to some embodiments.

FIG. 14 is an interface diagram 1400 depicting an example user interface displaying a dashboard interface that shows the user high-level summary information regarding the organization or accounting practice, according to some embodiments. The user interface of FIG. 14 can be shown to an accounting services provider or an organization (e.g., in response to an operation of the element 715 in FIGS. 7-13). The elements 705 and 715 are described above with respect to FIG. 7. The element 1110 is described above with respect to FIG. 11.

The element 1420, labeled "Accounts," may be operable to return the user to the user interface of FIG. 7 or FIG. 9, from which the user can view all available accounts. The element 1430, labeled "Reports," may be operable to provide a user interface for generating reports regarding the organization named in the element 1110.

The elements 1440, 1460, and 1480 each display the name of a BI. The elements 1450, 1470, and 1490 each display corresponding information regarding values of the BI for the organization. The elements 1440-1490 may be displayed by widgets provided by a third-party plug-in partner. The widget may show additional information, be operable to cause the display of additional information, or both. More or fewer BIs may be displayed in various embodiments. Information regarding the BI values may be shown in text, as a graph, or a combination. For example, the element 1450 shows the historical values of the gross profit ratio as a graph, the current value in text as 18%, a vertical arrow showing that the current value is higher than a previous value, and a number showing that the amount of the change is 15.2%. As another example, the element 1490 shows the current value of the work-in-progress ledger balance in text as 560,210 along with a text indication that this amount is 3,754 below average. The information shown may vary based on the BI, the current value of the BI, the rate of change of the value of the BI, selection by the user, selection by the organization, or any suitable combination thereof.

Figure 15:
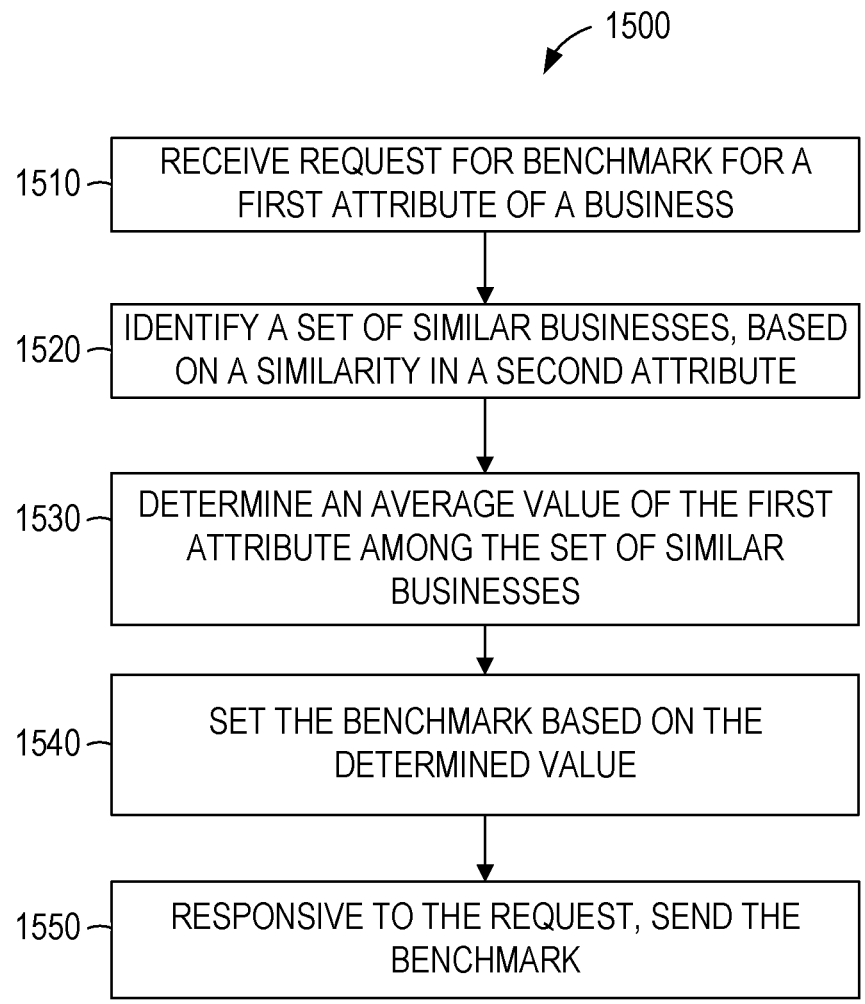
FIG. 15 is a flowchart of an example method for providing benchmarks, according to some embodiments.

FIG. 15 is a flowchart of an example method 1500 for generating benchmarks and responding to benchmark requests. The operations in the method 1500 may be performed by a server device using modules such as those shown in FIG. 1.

In the operation 1510, a request for a benchmark for an attribute of a business is received. For example, a request for a benchmark for the gross profits of a particular business may be received by an application server VM 320 and passed to the analytics module 142.

In the operation 1520, a set of similar businesses is identified, based on a similarity between the similar businesses and the particular business in a second attribute. For example, the set of similar businesses may have a number of employees within a range centered about the number of employees of the particular business for which the benchmark is requested. To illustrate, if the business for which the benchmark is requested has 30 employees, the similar businesses may be businesses having between 25 and 35 employees. Other attributes or combinations of attributes may be used. For example, businesses of a similar age, having a similar number of employees, located in cities of similar size may comprise the set of similar businesses. Additional criteria that may be used include industry, location, number of transactions per month, average transaction size (e.g., dollar amount), average transaction quantity (e.g., number of items), turnover to revenue ratio, number of full-time employees, retail floor space, and so on.

In some example embodiments, criteria used to identify the set of similar businesses are determined by an operator of the system. For example, a programmer or administrator may define an algorithm by which businesses are grouped with each other. Alternatively or additionally, criteria used to identify the set of similar businesses are determined as part of the process of requesting an alert. For example, an accountant may define the criteria to use for a particular entity, for a particular alert, or any suitable combination thereof.

In operation 1530, an average value of the first attribute among the set of similar businesses is determined. The average may be a median value, a mean value, or another type of average value. For example, the gross profits of every business in the set of similar businesses may be summed and divided by the number of businesses in the set, generating a mean value of the requested gross profits benchmark. Quartile values can also be calculated. For example, FIG. 12 shows quartile values for the gross profit.

In operation 1540, the benchmark is set based on the determined value. For example, the benchmark may be set equal to the determined value. Alternatively, the benchmark may use the determined value as one of a number of inputs. For example, the average gross profits for all companies in the business sector of the business may be blended with the value determined in operation 1530 to set the benchmark.

In operation 1550, the benchmark is sent in response to the request received in operation 1510. For example, if the request of operation 1510 was received by an API function call or hypertext transport protocol (HTTP) request, the response to the function call or HTTP request may include the benchmark.

Figure 16:
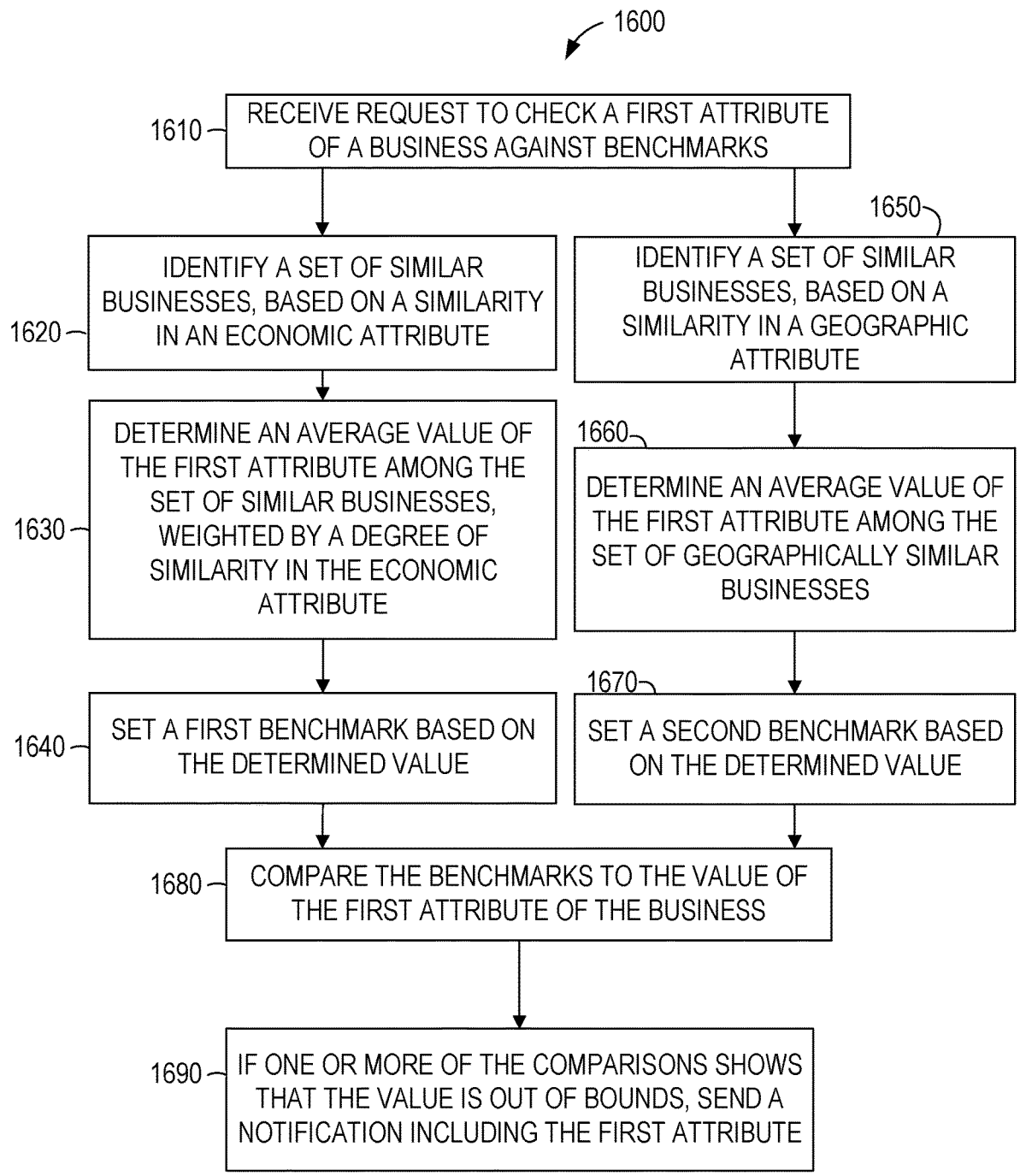
FIG. 16 is a flowchart of an example method for providing benchmarks, according to some embodiments.

FIG. 16 is a flowchart of an example method 1600 for checking benchmarks and generating notifications. The operations in the method 1600 may be performed by a server device using modules such as those shown in FIG. 1.

In operation 1610, a request is received to check a first attribute of a business against benchmarks. For example, a request to compare the debt-to-equity ratio of a particular business against its peers may be received.

In operations 1620 and 1650, sets of comparable businesses are identified. In operation 1620, the set of similar businesses is identified based on a similarity in an economic attribute (e.g., gross income, net profits, average salary, etc.). For example, a range may be defined that ranges from 50% to 150% of the value of the economic attribute of the business being benchmarked. To illustrate, if the benchmarked business has a net profit of 50,000, similar businesses may be those having net profits in the range of 25,000-75,000. Other percentages and ranges may also be used. In operation 1650, the set of similar businesses is identified based on a similarity in a geographic attribute (e.g., same or similar city, same or similar country, etc.)

In operation 1630, an average value of the first attribute among the economically similar businesses is determined, weighted by a degree of similarity in the economic attribute. For example, if the economic attribute is gross income, the weight of a similar business with a gross income that is nearly identical to the gross income of the business being benchmarked may have a weight of 1. Meanwhile, the weight of a similar business with a gross income at the edge of the range for similarity may be 0.25. Various formulae for adjusting the weight may be used. For example, the drop-off in weight from a maximum value when the attributes are identical or nearly identical to a minimum value at the edge of the range may be determined linearly, exponentially, logarithmically, or otherwise. Different weighting schemes may be used for different economic attributes, different benchmarked attributes, or both. The weighting scheme for a particular economic attribute, benchmarked attribute, or attribute combination may be set by the user, by the organization being benchmarked, by a machine learning algorithm, or any suitable combination thereof.

In operation 1640, a first benchmark is set based on the value determined in operation 1630. This may be performed in a manner similar to operation 1540, described above.

In operation 1660, an average value of the first attribute among the set of geographically similar businesses is determined. In operation 1670, a second benchmark is set based on the value determined in operation 1630. These operations may be performed in a manner similar to operations 1530 and 1540, described above. The average value determined in operation 1660 can be weighted based on the degree of geographic similarity between the geographically similar business and the business being benchmarked. For example, if the business being benchmarked is located in a city of 600,000 residents and the geographically similar businesses are located in cities having 400,000-800,000 residents, the businesses in cities closer to the center of the range may have a higher weight than businesses located in cities near the edge of the range.

In operation 1680, the first and second benchmarks are each compared to the value of the first attribute of the business. For example, the first benchmark may be a benchmark for a debt-to-equity ratio based on the debt-to-equity ratios of businesses with similar net profits. The second benchmark may be a benchmark for a debt-to-equity ratio based on the debt-to-equity ratios of businesses in the same country. The debt-to-equity ratio of the benchmarked business is compared to each of the first and second benchmarks and comparison results are generated.

In operation 1690, if either comparison indicates that the attribute of the business is out of bounds, a notification or alert is sent that includes the first attribute. For example, as discussed above, two separate benchmarks are generated for the debt-to-equity ratio of the benchmarked business. As long as at least one of the benchmarks is out of bounds (e.g., if the debt-to-equity ratio is out of bounds relative only to the benchmark generated from economically comparable businesses), a notification indicating that the debt-to-equity ratio of the benchmarked business has failed a benchmark check is be generated and sent to a representative of the benchmarked business, an accounting services provider for the business, a creditor of the business, or any suitable combination thereof. Additionally, the notification may include information regarding the out of bounds benchmark (e.g., if it was an economic or geographic benchmark, the value of the attribute and the benchmark, the attributes used in selecting members of the sets of similar businesses, and so on). In some example embodiments, the notification is provided by an in-app notification in an application on a mobile device.

Figure 17:
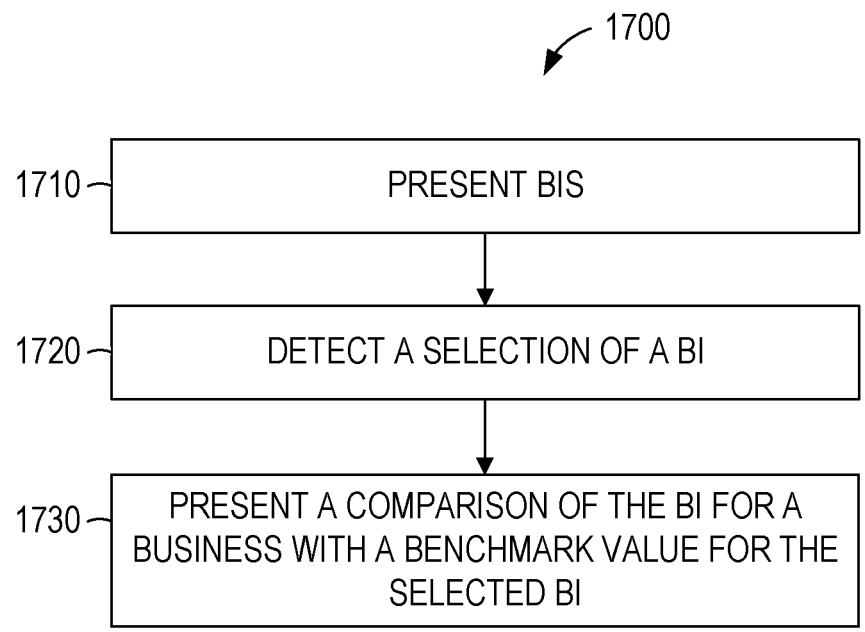
FIG. 17 is a flowchart of an example method for presenting benchmarks, according to some embodiments.

FIG. 17 is a flowchart of an example method 1700 for presenting benchmarks, according to some embodiments. The method 1700 may be performed by a client device 480 or 490 using modules such as those shown in FIG. 5.

In operation 1710, BIs are presented. The BIs may be retrieved from a server and be for an organization associated with the user viewing the BIs. The BIs can be presented by the display module 520 on a display device such as a computer monitor or smartphone screen. The presentation of the BIs may include the name of each BI, the value of each BI for the organization, and other data for the BI.

In operation 1720, a selection of a BI is detected. The selection may be detected by the input module 530. For example, the user may use a mouse to click on a portion of the screen representing a BI.

In operation 1730, a comparison of the value of the selected BI for the organization with a benchmark value for the selected BI is presented. For example, if the selected BI is revenue per employee, the revenue per employee of the business and the benchmark revenue per employee are presented. The benchmark value for the BI may be determined as described above in method 1500. The comparison may be shown numerically, graphically, or both. The benchmark value may be retrieved by communication with a server. For example, an identifier corresponding to the selected BI may be sent to the server as part of a request using the communication module 510, and the value of the BI for the organization and the benchmark value for the BI may be returned by the server to the client device 480 or 490. After receipt of the values, the display module 520 can display the data to the user.

Figure 18:
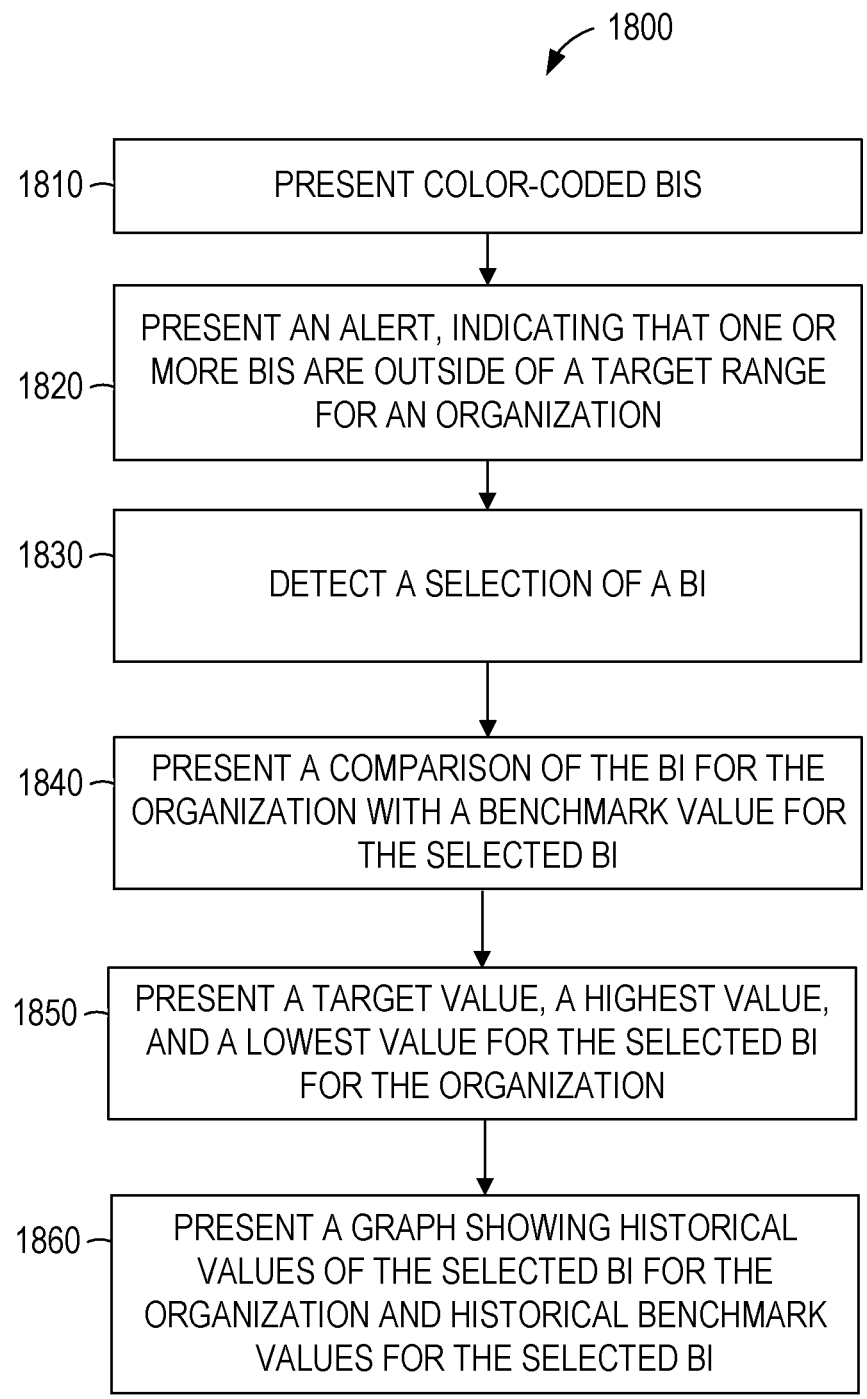
FIG. 18 is a flowchart of an example method for presenting benchmarks, according to some embodiments.

FIG. 18 is a flowchart of an example method 1800 for presenting benchmarks, according to some embodiments. The method 1800 may be performed by a client device 480 or 490 using modules such as those shown in FIG. 5.

In operation 1810, color-coded BIs are presented. For example, indicators for a number of BIs may be presented, colored red when the value of the BI for an organization is outside of a predetermined range in a negative way, colored blue when the value of the BI is within the predetermined range, and colored green when the value of the BI is outside of the predetermined range in a positive way. Other colors may be used, along with other meanings for the colors. For example, BIs for which values are current may be presented in turquoise while older BI values are presented in magenta. The color-coding may be applied by coloring the text of the name of the BI, by coloring an area corresponding to the BI (e.g., a circle in a row of the BI in a table or a box around the name of the BI), or otherwise.

In operation 1820, an alert is presented, indicating that one or more BI values are outside of a target range for the organization. For example, as shown in FIG. 13, the target range for the gross profit may be 1,500-5,700. When the gross profit for the organization is outside of that range and all other BI values are within the target range, the alert presented in operation 1820 may indicate that the alert concerns one BI, concerns the gross profit specifically, concerns at least one BI, or otherwise alerts the user that one or more BI values are outside of their corresponding target ranges. Similarly, if multiple BI values are outside of their corresponding target ranges, the alert may indicate the number of BI values that are out-of-bounds, the names of the BI values, the names of a subset of the BI values and a total or additional count, or otherwise inform the user of the BI values being outside of their target ranges. For example, the alert in FIG. 8 may be displayed.

In operation 1830, a selection of a BI is detected. The selection may be detected by the input module 530. For example, the user may use a mouse to click on a portion of the screen representing a BI. The activated area may be the area presented in operation 1810, the alert presented in operation 1820, or a particular portion of either. For example, if the alert names one BI and informs the user that multiple BIs are out of range, clicking on the named BI may operate as a selection of that BI while clicking on other portions of the displayed alert may have no effect, dismiss the alert, or provide another effect.

In operation 1840, a comparison of the selected BI with a benchmark value for the selected BI is presented. For example, the elements 1210 of FIG. 12 and 1350 of FIG. 13 each show a comparison of the gross profit with a benchmark value for the gross profit. Other ways of presenting the comparison could also be used.

In operation 1850, a target value, a highest value, and lowest value for the selected BI for the organization are presented. For example, the target value may be set by an accountant for the organization, determined automatically by comparison to similar organizations, set by a member of the organization, or otherwise determined. The highest and lowest value for the selected BI may be retrieved from historical data for the organization. For example, the highest and lowest values of the BI for the organization over the past week, month, quarter, year, or lifetime of the organization may be used.

In operation 1860, a graph showing historical values of the selected BI for the organization and historical benchmark values for the selected BI are shown. For example, element 1350 of FIG. 13 shows a historical graph of the gross profits of an organization along with the benchmark values of the gross profits for the organization.

FIG. 19 is a block diagram of a database schema 1900 used for benchmarking through data mining, according to some example embodiments. The database schema 1900 includes Account table 2905, kpi.DAD table 1910, kpi.AccountType table 1915, kpi.Component table 1920, kpi.ComponentFact table 1925, kpi.DateDimension table 1930, kpi.DateGranularity table 1935, kpi.MetricComponent table 1940, kpi.Metric table 1945, kpi.TrendIndicator table 1950, and kpi.MetricFact table 1955.

The Account table 1905 stores information for each account in the accounting system. As shown in the example schema 1900, the Account table includes a Name column, an OrganizationID column, an AccountTypePublicKey column, and a DADPublicKey column. The Name column may hold a display name for the account. For example, the value of the Name column may be used in presenting a user interface customized for the account, in displaying information about the account to other users, or both. The OrganizationID provides a unique identifier for the account. In some example embodiments, a User table may be used that stores a user name and password for a number of users, each of which is associated with one or more rows of the Account table 1905. The AccountTypePublicKey and DADPublicKey fields may be populated with references to the kpi.DAD and kpi.AccountType tables, and identify an AccountType for the account, a DAD for the Account, or both.

The kpi.DAD table 1910 stores type definition data for each DAD. As shown in the example database schema 1900, the kpi.DAD table 1910 includes a DADID column, a CountryCode column, a DADCode column, a Format column, and a DADPublicKey column. In this example embodiment, each DADID is country-specific. Accordingly, the same DADID may have different meanings in different countries. Thus, while each DADID is unique for a particular CountryCode value, the DADPublicKey column is used to store a unique identifier for each DAD in a single value. The Format column indicates whether values of facts for the DAD are stored as percentages or numbers.

The kpi.AccountType table 1915 stores type definition data for each AccountType. As shown in the example database schema 1900, the kpi.AccountType table 1915 includes an AccountTypeID column, a TypeCode column, a ClassCode column, a Format column, and a PublicKey column. The PublicKey for an entry stores the unique identifier for the entry. In some example embodiments, the AccountType is not defined on a per-country basis, and so may also serve as a unique identifier. The TypeCode and ClassCode provide additional information about the AccountType. For example, AccountTypes may be divided into types and classes, indicated in the TypeCode and ClassCode fields for an entry. As in the kpi.DAD table, the Format indicates whether values of facts for the AccountType are stored as percentages or numbers.

The kpi.Component table 1920 provides a common data type to allow access to either an AccountType or a DAD, as needed. Accordingly, only one of the DADID or AccountTypeID fields is populated for each entry. This provides a mapping between a ComponentID and the populated DADID or AccountTypeID. In some example embodiments, the Label field stores a human-readable label for the component. The ValueLabelID field stores a unique identifier for the corresponding Label. In some example embodiments, AccountTypes are defined outside of the accounting system (e.g., by a bank, by a data aggregator, or any suitable combination thereof). The number of DADs may be larger, providing a finer-grained division of account types. For example, 20 AccountTypes may be used and 300 DADs may be used.

The kpi.ComponentFact table 1925 stores data values associated with a particular Component for a particular Account. As shown in the example schema 1900, the kpi.ComponentFact table 1925 includes a ComponentFactID column, an OrganizationID column, a ComponentID column, a DateID column, a DateGranularity column, a Value column, and a TrendIndicatorID column. The ComponentFactID column provides a unique identifier for each ComponentFact. The Value column stores the value of the fact for the account identified by the OrganizationID. The format of the value is identified in the kpi.DAD or kpi.AccountType row that corresponds to the ComponentID (via a lookup using the kpi.Component table 1920). The DateID, which references the kpi.DateDimension table 1930, and the DateGranularity, which references the kpi.DateGranulatity table 1935, identify the date or date range to which the value applies.

The kpi.DateDimension table 1930 associates unique DateID values with particular dates and date ranges. As shown in the example database schema 1900, the kpi.DateDimension table 1930 includes a DateID column, a DateValue column, a Year column, a Month column, a Day column, a CalendarDisplay column, a MonthDisplay column, and a WeekDisplay column. The DateID is a unique identifier for the date. The DateValue stores the date as a single value. The Year, Month, and Day store the same value as the DateValue, in a different form. The CalendarDisplay, MonthDisplay, and WeekDisplay values are used to display the date in calendar, month, and week formats, respectively. For example, the date of Jan. 1, 2015 may be stored with a DateValue of 2015-01-01, a Year of 2015, a Month of 1, and a Day of 1. The CalendarDisplay value may be "Jan. 1, 2015," the MonthDisplay may be "January," and the WeekDisplay may be "Week 1."

The kpi.DateGranularity table 1935 stores the various date granularities used by the accounting system. For example, daily, weekly, monthly, and yearly date granularities may be used. As discussed above with respect to the kpi.ComponentFact table 1925, values may be stored in a variety of date granularities. For example, the revenue for the day of Jan. 1, 2015 may be stored as a kpi.ComponentFact for the DateID associated with that date and a DateGranularity named "daily." Similarly, the revenue for the month of January 2015 may be stored as a kpi.Component fact for the same DateID and a DateGranularity named "monthly."

The kpi.MetricComponent table 1940 associates components with metrics. A metric is a measurement for a business determined from one or more components. For example, a metric for gross revenue may be determined from a revenue component alone, while a metric for gross profit margin may be determined from a revenue component and a cost of goods sold component. Accordingly, the metric for gross revenue would have one entry in the kpi.MetricComponent table 1940, mapping the MetricID to the ComponentID, and the metric for gross profit margin would have two entries in the kpi.MetricComponent table 1940, with matching MetricIDs and different ComponentIDs.

The kpi.Metric table 1945 identifies a metric. The MetricID is a unique identifier for the metric. The Name is a human-readable name of the metric. The Definition is a human-readable definition of the metric. The Format indicates whether the metric is a value or a percentage. For example, a metric for gross revenue may be a value while a metric of gross profit margin may be a percentage.

The kpi.TrendIndicator table 1950 identifies a trend indicator. A trend indicator is an indicator of a trending change over time. For example, trend indicators for "increasing," "decreasing," and "unchanged" may be used. The TrendIndicatorID is a unique identifier for the trend indicator. The Trend column stores a human-readable identifier for the trend. Trends may be determined relative to an immediately previous time period (e.g., today's value relative to yesterday's value or this month's value relative to last month's value), to a parallel time period (e.g., the revenue this month relative to the revenue for the same month last year), relative to a moving average (e.g., the revenue this month relative to the average revenue over the last three months), or any suitable combination thereof.

The kpi.MetricFact table 1955 stores values for metrics. As shown in the example database schema 1900, the kpi.MetricFact table 1955 includes a MetricFactID column, an OrganizationID column, a MetricID column, a DateID column, a DateGranularity column, a Value column, and a TrendIndicatorID column. The MetricFactID provides a unique identifier for the metric fact. The OrgnizationID identifies the account for which the metric fact applies. The MetricID identifies the metric for which the metric fact contains a value. For example, the MetricID may identify an entry in the kpi.Metric table 1945 named "gross profit margin." The DateID and DateGranularity identify the date or date range to which the metric fact applies. For example, the DateID may identify an entry in the kpi.DateDimension table 1930 having a DateValue of 2015-01-01 (Jan. 1, 2015) and the DateGranularity may identify an entry in the kpi.DateGranularity table 1935 having a name of "annual." The Value stores the value of the metric fact. For example, the Value may store the gross profit margin for the account identified by the OrganizationID for the year 2015. The TrendIndicatorID indicates the trend in the value as compared to a previous value of the metric fact. For example, whether the gross profit margin for the year 2015 has increased, decreased, or remained unchanged (or within a predetermined range) relative to the gross profit margin for the year 2014.

In some example embodiments, configuration options are loaded from the database instead of being hard-coded in application software or hardware. The use of configuration options may better support changes in the environment. Examples of changes that can be handled without any code changes include:

Database is relocated
Database is renamed
Complete reload of data required
Specific reload of data for a single Organization required
Metric name change
Inclusion/Exclusion of specific report codes
New Metric/KPI added
Metric deleted
Metric description change
New regions included in the process In some example embodiments, a web service provides an interface between the web site providing the UI of FIGS. 6-13 and a database using the database schema 1900. The web service may transform data received by the web site (e.g., business metrics and component data) into a hierarchy suitable for rendering into a document or user interface. For example, the web service may correlate components to metrics based on variadic component formulas stored in metric metadata, by the component data point date stamps, or both. The web service may support a single method that supports being called in two different forms.

In an example first form, the method takes two parameters: the start and end dates of a date range. In response, the method provides all metrics related to an organization for a specific date range. In some example embodiments, a similar method is made accessible to third parties via the API VM 340. In each case, the method may provide read-only access to a database (e.g., a database using the database schema 1900) to retrieve values.

In an example second form, the parameter list includes start and end dates, as well as the following additional parameters. The method provides only the subset of metrics corresponding to both the date range and the additional filters defined by the other parameters.

metricNames—defines the metrics to be retrieved
dateGranularities—defines the date granularities to be retrieved
sourceTypes—defines the source types to be retrieved In some example embodiments, the metricNames, dateGranularities, and sourceTypes parameters are passed using a comma-separated values (CSV) file. To illustrate, an example method call of the second form could include the parameter list (2014-08-01, 2014-08-01, "Gross Profit Margin, Debt to Equity", "Weekly, Monthly", "Account Type, Report Code"), wherein the CSV values are passed directly as a string or as the contents of separate files. In response, the web service would provide all Gross Profit Margin and Debt to Equity metrics stored for Aug. 1, 2014 having date granularities of Weekly or Monthly.

In some example embodiments, the web service returns the data requested in Javascript object notation (JSON). For example, the data structure below may be received in response to the example method call above.

```
Content-Type: application/json
{
  "pagination": {
    "page": 1,
    "pageSize": 2,
    "pageCount": 1,
    "itemCount": 2,
    "links": null
  },
  "items": [
    {
      "name": "Gross Profit Margin",
      "description": "Profit Margin on Sales, Without Accounting for Other Costs",
      "definition": "<table><tr><td>Revenue - Cost of Goods sold </td><td>Over Revenue</td></tr></table>"
      "format": "0.0%",
      "sourceTypeName": "Account Type",
      "granularities": [
        {
          "name": "Monthly",
          "series": [
            {
              "date": "2010-01-01T00:00:00",
              "value": 996.7700000000,
              "trendIndicator": "Up",
              "components": [
                {
                  "name": "Closing Sales",
                  "value": 58119.1000000000,
                  "trendIndicator": "Down",
                  "format": "$0.00"
                },
                {
                  "name": "Closing Other Income",
                  "value": 58119.1000000000,
                  "trendIndicator": "Down",
                  "format": "$0.00"
                }
              ]
            },
            {
            "date": "2010-02-01T00:00:00",
            "value": 996.7700000000,
            "trendIndicator": "Up",
            "components": [
              {
                "name": "Closing Sales",
                "value": 58119.1000000000,
                "trendIndicator": "Down",
                "format": "$0.00"
              },
              {
                "name": "Closing Other Income"
                "value": 58119.1000000000,
                "trendIndicator": "Down",
```

-continued

```
              "format": "$0.00"
            }
          ]
        }
      ]
    },
    {
      "name": "Weekly",
      "series": [
        {
          "date": "2010-10-09T00:00:00",
          "value": 997.0500000000,
          "trendIndicator": "Up",
          "components": [
            {
              "name": "Closing Sales",
              "value": 76488.6800000000,
              "trendIndicator": "Down",
              "format": "$0.00"
            },
            {
              "name": "Closing Other Income",
              "value": 76488.6800000000,
              "trendIndicator": "Down",
              "format": "$0.00"
            }
          ]
        }
      ]
    }
  ]
},
{
  "name": "Debtto Equity",
  "description": "Ratio of Debt to Equity",
  "definition": "<table><tr><td>Total Liabilities</td><td>Over Equitys/td></tr></table>"
  "format": "0.00",
  "sourceTypeName": "Account Type",
  "granularities": [
    {
      "name": "Monthly",
      "series": [
        {
          "date": "2010-01-01T00:00:00",
          "value": 996.7700000000,
          "trendIndicator": "Up",
          "components": [ ]
        },
        {
          "date": "2010-02-01T00:00:00",
          "value": 996.7700000000,
          "trendIndicator": "Up",
          "components": [ ]
        }
      ]
    },
    {
      "name": "Weekly",
      "series": [
        {
          "date": "2010-10-09T00:00:00"
          "value": 996.7700000000,
          "trendIndicator": "Up",
          "components": [ ]
        },
        {
          "date": "2010-10-16T00:00:00"
          "value": 996.7700000000,
          "trendIndicator": "Up",
          "components": [ ]
        }
      ]
    }
  ]
}
]
}
```

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Figure 20:
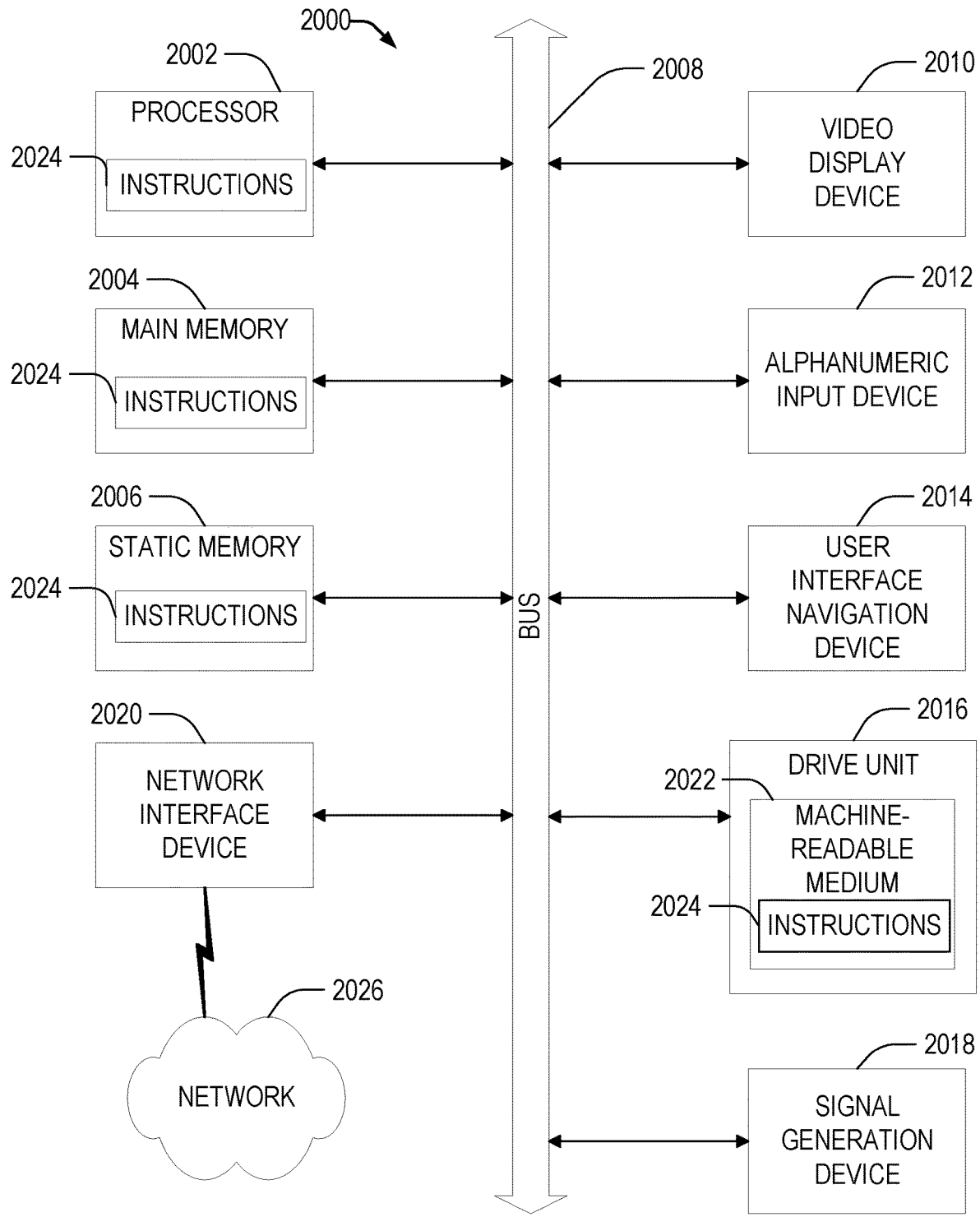
FIG. 20 is a block diagram of a machine in the example form of a computer system within which a set of instructions, for causing the machine to perform any one or more of the methodologies discussed herein, may be executed, according to some embodiments.

FIG. 20 is a block diagram of a machine in the example form of a computer system 2000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 2000 includes a processor 2002 (e.g., a central processing unit (CPU), a graphics processing unit (GPU) or both), a main memory 2004, and a static memory 2006, which communicate with each other via a bus 2008. Computer system 2000 may further include a video display device 2010 (e.g., a liquid crystal display (LCD) or a cathode ray tube (CRT)). Computer system 2000 also includes an alphanumeric input device 2012 (e.g., a keyboard), a user interface (UI) navigation device 2014 (e.g., a mouse or touch sensitive display), a disk drive unit 2016, a signal generation device 2018 (e.g., a speaker) and a network interface device 2020.

Disk drive unit 2016 includes a machine-readable medium 2022 on which is stored one or more sets of instructions and data structures (e.g., software) 2024 embodying or utilized by any one or more of the methodologies or functions described herein. Instructions 2024 may also reside, completely or at least partially, within main memory 2004, within static memory 2006, and/or within processor 2002 during execution thereof by computer system 2000, main memory 2004 and processor 2002 also constituting machine-readable media.

While machine-readable medium 2022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Instructions 2024 may further be transmitted or received over a communications network 2026 using a transmission medium. Instructions 2024 may be transmitted using network interface device 2020 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:

providing a platform in a cloud computing environment, the cloud computing environment providing the platform by a primary data center in an online state and comprising one or more pods, each pod comprising one or more application server virtual machines that are specific to the pod, and in case of a fault in the primary data center, the cloud computing environment providing the platform by a secondary data center in an online state, the secondary data center comprising one or more pods to which the one or more pods of the primary data center are replicated, respectively;

importing into user data, by the platform, financial data for each of a plurality of users having a user account with the platform, the financial data including banking data, the plurality of users including a first user;

receiving, at the platform and from a client device via a network, a request for benchmarking a first attribute of the first user, the first attribute of the first user being part of the user data of the first user that includes the imported financial data of the first user and user account data of the first user, the user account data being maintained by the platform;

accessing, by the platform, the user data for the plurality of users;

identifying, by the platform, a first set of similar users subscribed to the platform that have a value of a second attribute in the user data similar to a value of a second attribute of the first user;

identifying, in the user data of the platform, a value of the first attribute for the first set of similar users;

determining, by the platform, a statistical value based on the values of the first attribute for the first set of similar users;

setting, by the platform, a benchmark of the first attribute based on the statistical value;

sending, via the network, the benchmark of the first attribute to the client device for presentation in a user interface of the platform;

while the primary data center is in an online state, maintaining the secondary data center in an offline state in which energy consumption is reduced relative to power consumption in the online state of the secondary data center; and in response to the primary data center developing a fault, changing a state of the secondary data center from the offline state to an online state in which the secondary data center is providing the platform in the cloud computing environment, and changing a state of the primary data center to an offline state.

2. The method as recited in claim 1, further comprising:

storing, at a primary data center storage layer, the imported financial data for each of the plurality of users having a user account with the platform; and replicating the primary data center storage layer in a secondary data center storage layer, including replicating the imported financial data for each of the plurality of users having a user account with the platform, so that the imported financial data for each of the plurality of users having a user account with the platform is consistent at the secondary data center storage layer and the primary data center storage layer.

3. The method as recited in claim 1, further comprising:
while the primary data center is in the online state, balancing load between the one or more pods of the primary data center; and
while the secondary data center is in the online state, balancing load between the one or more pods of the secondary data center.

4. The method as recited in claim 1, further comprising:
causing, by the platform, a display in the client device of a value of the first attribute of the first user and the benchmark of the first attribute.

5. The method as recited in claim 1, wherein the statistical value is an average of values of the first attribute for the first set of similar users, each similar user being assigned a weight based on a difference between the value of the second attribute for the similar user and the value of the second attribute for the first user.

6. The method as recited in claim 1, wherein the user interface comprises one or more of:
a value of the benchmark of the first attribute, a direction of change over a previous period, a graph of the value of the benchmark of the first attribute over time, a current target of the value of the benchmark of the first attribute, or a benchmark of a first attribute comparison value in reference to values of the benchmark of the first attribute for the plurality of users.

7. The method as recited in claim 1, further comprising:
comparing the benchmark of the first attribute to a value of the first attribute of the first user;
determining that the value of the first attribute of the first user is outside a predefined desired range of values based on the comparison; and
sending a notification to the user interface indicating that the value of the first attribute of the first user is outside the predefined desired range of values.

8. The method as recited in claim 1, further comprising:
identifying a second set of similar users that have a value of a geographical attribute in the user data similar to a value of the geographical attribute of the first user;
determining, by the platform, a second statistical value of the first attribute for the second set of similar users;
setting a geographical benchmark based on the second statistical value; and
sending the geographical benchmark to the client device.

9. The method as recited in claim 1, wherein the first attribute of the first user is selected from the group consisting of:
a number of transactions in a predetermined time period, an average transaction size, a number of full-time employees, a location, a turnover rate, a debt-to-equity ratio, a floor space, a land area, a profit as a percentage of stock, a profit as a percentage of land area, and a profit as a percentage of retail space.

10. The method as recited in claim 1, further comprising:
periodically analyzing, by the platform, a value of the benchmark;
setting up an alert when the value of the benchmark is outside a predetermined range of values; and
sending the alert to the first user.

11. The method as recited in claim 1, wherein identifying the first set of similar users further comprises:
from the users that have a value of the second attribute in the financial data similar to the value of the second attribute of the first user, selecting users for the first set of similar users that have a similar type of business as the first user.

12. A cloud computing environment comprising a primary data center and a secondary data center, the primary data center comprising:
one or more computer processors, and a memory comprising instructions, wherein the instructions, when executed by the one or more computer processors, cause the one or more computer processors to provide one or more pods, each pod comprising one or more application specific virtual machines that are specific to the pod;
the secondary data center comprising:
one or more computer processors, and a memory comprising instructions, wherein the instructions, when executed by the one or more computer processors, cause the one or more computer processors to provide one or more pods, each pod replicating a respective pod of the primary data center;
the cloud computing environment being configured to provide a platform by the primary data center while the primary data center is in an online state, and, in case of a fault at the primary data center, to provide the platform by the secondary data center;
the platform being configured to:
import, into user data, financial data for each of a plurality of users having a user account with the platform, the financial data including banking data, the plurality of users including a first user;
receive, from a client device via a network, a request for benchmarking a first attribute of the first user, the first attribute of the first user being part of the user data of the first user that includes the imported financial data of the first user and user account data of the first user, the user account data being maintained by the platform;
access the user data for the plurality of users;
identify a first set of similar users subscribed to the platform that have a value of a second attribute in the user data similar to a value of a second attribute of the first user;
identify, in the user data of the platform, a value of the first attribute for the first set of similar users;
determine a statistical value based on the values of the first attribute for the first set of similar users;
set a benchmark of the first attribute based on the statistical value;
send, via the network, the benchmark of the first attribute to the client device for presentation in a user interface of the platform;
while the primary data center is in an online state, maintain the secondary data center in an offline state in which energy consumption is reduced relative to power consumption in the online state of the secondary data center; and
in response to the primary data center developing a fault, change a state of the secondary data center from the offline state to an online state in which the secondary data center is providing the platform in the cloud computing environment, and changing a state of the primary data center to an offline state.

13. The cloud computing environment as recited in claim 12, wherein the statistical value is an average of values of the first attribute for the first set of similar users, each similar user being assigned a weight based on a difference between the value of the second attribute for the similar user and the value of the second attribute for the first user, wherein the weight is based on a difference between a size of a city of the first user and a size of a city of the user from the first set of similar users.

14. The cloud computing environment as recited in claim 12, wherein the user interface comprises one or more of a value of the benchmark, a direction of change over a previous period, a graph of the value of the benchmark over time, a current target of the value of the benchmark, or a benchmark comparison value in reference to values of the benchmark for the plurality of users.

15. The cloud computing environment as recited in claim 12, the platform is further configured to:
compare the benchmark to a value of the first attribute of the first user;
determine that the value of the first attribute of the first user is outside a predefined desired range of values based on the comparison; and
send a notification to the user interface indicating that the value of the first attribute of the first user is outside the predefined desired range of values.

16. The cloud computing environment as recited in claim 12, wherein the platform is further configured to:
identify a second set of similar users that have a value of a geographical attribute in the user data similar to a value of the geographical attribute of the first user;
determine a second statistical value of the first attribute in the second set of similar users;
set a geographical benchmark based on the second statistical value; and
send the geographical benchmark to the client device.

17. The cloud computing environment as recited in claim 12, wherein the second attribute is a geographical attribute including one of same city, same region, same country, similar city, similar region, similar country, a distance from a location of the first user, or a size of a city where each user is located.

18. A non-transitory machine-readable storage medium including instructions that, when executed by a cloud computing environment comprising a primary data center and a secondary data center, cause the cloud computing environment to perform operations comprising:
at the primary data center, providing one or more pods, each pod comprising one or more application specific virtual machines that are specific to the pod;
at the secondary data center, providing one or more pods, each pod replicating a respective pod of the primary data center;
the operations performed by the cloud computing environment further comprising providing a platform by the primary data center while the primary data center is in an online state, and, in case of a fault at the primary data center, to provide the platform by the secondary data center;
the platform being configured to:
import, into user data, financial data for each of a plurality of users having a user account with the platform, the financial data including banking data, the plurality of users including a first user;
receive, from a client device via a network, a request for benchmarking a first attribute of the first user, the first attribute of the first user being part of the user data of the first user that includes the imported financial data of the first user and user account data of the first user, the user account data being maintained by the platform;
access the user data for the plurality of users;
identify a first set of similar users subscribed to the platform that have a value of a second attribute in the user data similar to a value of a second attribute of the first user;
identify, in the user data of the platform, a value of the first attribute for the first set of similar users;
determine a statistical value based on the values of the first attribute for the first set of similar users;
set a benchmark of the first attribute based on the statistical value;
send, via the network, the benchmark of the first attribute to the client device for presentation in a user interface of the platform;
while the primary data center is in an online state, maintain the secondary data center in an offline state in which energy consumption is reduced relative to power consumption in the online state of the secondary data center; and
in response to the primary data center developing a fault, change a state of the secondary data center from the offline state to an online state in which the secondary data center is providing the platform in the cloud computing environment, and changing a state of the primary data center to an offline state.

19. The non-transitory machine-readable storage medium as recited in claim 18, wherein the second attribute is a geographical attribute including one of same city, same region, same country, similar city, similar region, similar country, a distance from a location of the first user, or a size of a city where each user is located.

* * * * *